United States Patent
Kukkonen et al.

(10) Patent No.: US 11,613,091 B2
(45) Date of Patent: Mar. 28, 2023

(54) METHOD FOR INSERTING AN INSERT INTO A TIRE

(71) Applicant: Nokian Renkaat Oyj, Nokia (FI)

(72) Inventors: Esko Kukkonen, Nokia (FI); Jari Ojala, Nokia (FI); Teemu Soini, Tampere (FI); Atte Antikainen, Pirkkala (FI); Jani Räisänen, Pirkkala (FI)

(73) Assignee: Nokian Renkaat Oyj, Nokia (FI)

( * ) Notice: Subject to any disclaimer, the term of this patent is extended or adjusted under 35 U.S.C. 154(b) by 0 days.

(21) Appl. No.: 17/054,567

(22) PCT Filed: Jun. 5, 2019

(86) PCT No.: PCT/FI2019/050432
§ 371 (c)(1),
(2) Date: Nov. 11, 2020

(87) PCT Pub. No.: WO2019/234301
PCT Pub. Date: Dec. 12, 2019

(65) Prior Publication Data
US 2021/0245462 A1   Aug. 12, 2021

(30) Foreign Application Priority Data

Jun. 8, 2018 (EP) .................... 18397518

(51) Int. Cl.
*B60C 11/16* (2006.01)
*B60C 11/14* (2006.01)
(Continued)

(52) U.S. Cl.
CPC ...... *B29D 30/0061* (2013.01); *B60C 11/1637* (2013.01); *B60C 11/243* (2013.01);
(Continued)

(58) Field of Classification Search
CPC ..... B60C 11/14; B60C 11/16; B60C 11/1675; B60C 11/1637; B29D 30/66
See application file for complete search history.

(56) References Cited

U.S. PATENT DOCUMENTS 2,865,054 A * 12/1958 Constantakis .......... B60C 11/20
156/114
3,504,414 A * 4/1970 Breen .................... B29D 30/66
29/235
(Continued)

FOREIGN PATENT DOCUMENTS

AT          A93889 A    10/1991
CN          1311110 A    9/2001
(Continued)

OTHER PUBLICATIONS

Decision on Granting for corresponding Russian Patent Application No. 2020136912/11(068076), dated Apr. 29, 2021 (English Translation, 20 pages).
(Continued)

*Primary Examiner* — Cedrick S Williams
(74) *Attorney, Agent, or Firm* — Merchant & Gould P.C.

(57) ABSTRACT

The aim of the disclosed solution is to present a method of inserting an insert to a tread a tire such that the insert, particularly a fragile insert such as an insert comprising electronic components, may be protected against gripping and impact forces during its insertion. The disclosed solution is premised on an insert being housed, at least partially, in a sleeve upon and during its installation to a tread of a tire. Thus, the sleeve may be employed to provide protection for the insert against gripping and/or impact forces during the insertion of the insert into the tread a tire.

18 Claims, 14 Drawing Sheets

(51) Int. Cl.
 B29D 30/00 (2006.01)
 B60C 11/24 (2006.01)
 B60C 19/00 (2006.01)

(52) U.S. Cl.
 CPC ...... B60C 19/00 (2013.01); *B29D 2030/0083* (2013.01); *B60C 2019/004* (2013.01)

(56) References Cited

U.S. PATENT DOCUMENTS

| | | | | |
|---|---|---|---|---|
| 3,507,031 | A * | 4/1970 | Rebold | B29D 30/66 29/815 |
| 5,800,649 | A * | 9/1998 | Eromaki | B29D 30/66 156/114 |
| 6,374,886 | B1 | 4/2002 | Eromäki | |
| 9,056,531 | B2 | 6/2015 | Durat et al. | |
| 2005/0192727 | A1 * | 9/2005 | Shostak | B60C 23/041 701/37 |
| 2014/0166168 | A1 * | 6/2014 | Engel | B60C 23/0433 152/154.2 |
| 2017/0203615 | A1 | 7/2017 | Matsumoto | |
| 2017/0368889 | A1 * | 12/2017 | Ajoviita | B60C 11/16 |

FOREIGN PATENT DOCUMENTS

| | | | |
|---|---|---|---|
| CN | 102046397 A | 5/2011 | |
| CN | 203019986 U | 6/2013 | |
| CN | 103863019 A | 6/2014 | |
| CN | 103889701 A | 6/2014 | |
| CN | 105980140 A | 9/2016 | |
| CN | 107454876 A | 12/2017 | |
| DE | 4040707 A1 | 6/1991 | |
| EP | 2583840 A1 | 4/2013 | |
| EP | 2743101 A1 | 6/2014 | |
| EP | 3099476 B1 | 1/2019 | |
| GB | 1063936 A | 4/1967 | |
| JP | S59186703 A | 10/1984 | |
| JP | S62149403 U | 9/1987 | |
| JP | 2013082309 A | 5/2013 | |
| JP | 2014118146 A | 6/2014 | |
| JP | 5838703 B2 * | 1/2016 | |
| KR | 101843141 B1 | 3/2018 | |
| NO | 172382 B * | 4/1993 | ............ B60C 11/16 |
| WO | 92/13729 A1 | 8/1992 | |
| WO | 2009147047 A1 | 12/2009 | |
| WO | 2011057834 A1 | 5/2011 | |
| WO | WO-2018070378 A1 * | 4/2018 | ............ B60C 11/16 |

OTHER PUBLICATIONS

Bruno Wessel: "How To—BW Stud Insertion Tool TSIT-9—Bruno Wessel", YouTube, Oct. 25, 2016 (Oct. 25, 2016), XP054978936, Retrieved from the Internet: URL:https://youtu.be/hU6hyK0eebE [retrieved on Nov. 19, 2018].

Brunon Wessel Ltd: "Bruno Wessel Stud Insertion Tool Repair", YouTube, Oct. 11, 2016 (Oct. 11, 2016), p. 5, XP054979495, Retrieved from the Internet: URL:https://www.youtube.com/watch?v=YlpShxgxLTY [retrieved on Jul. 2, 2019].

Bruno Wessel et al: "Tire Stud Insertion Tool TSIT-8, TSIT-9 & TSIT-11pistolet de cramponnage pour pneus", Apr. 10, 2013 (Apr. 10, 2013), pp. 1-1, XP055601407, brunowessel.com/wp-content/uploads/2017/12/tsit_9_parts.pdf Retrieved from the Internet: URL:brunowessel.com/wp-content/uploads/2017/12/tsit_9_parts.pdf [retrieved on Jul. 2, 2019].

Chinese Office Action for CN Application No. 201980038296.7 dated Feb. 17, 2022 (17 pages, with English translation).

Japanese Office Action for JP Application No. 2020-567859 dated Mar. 14, 2022 (10 pages, with English translation).

Chinese Notification to Grant Patent Right for CN Application No. 201980038296.7 dated Aug. 11, 2022 (5 pages, with English translation).

Japanese Notice of Allowance for JP Application No. 2020-567859, dated Jan. 24, 2023, 4 pgs.

* cited by examiner

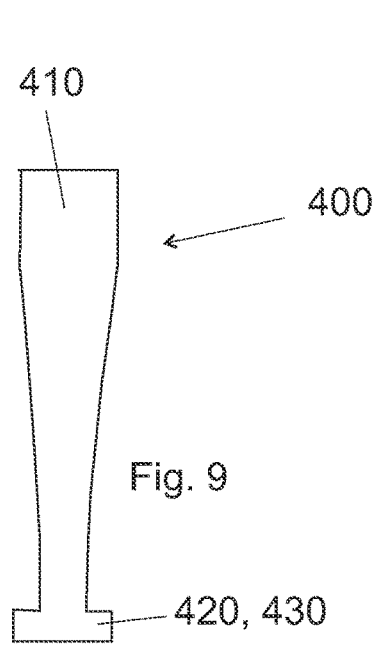
Fig. 9
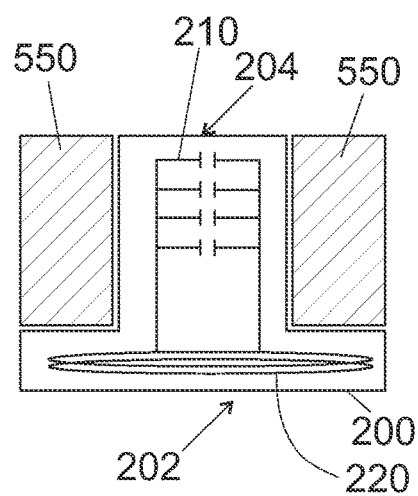
Fig. 10a
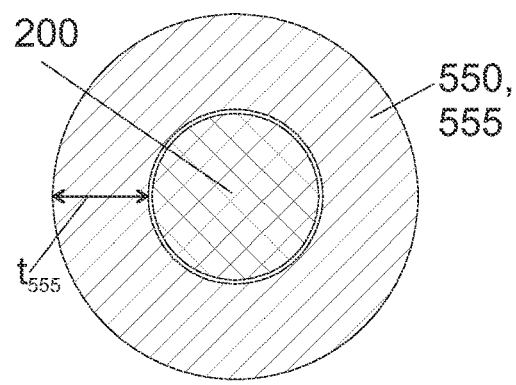
Fig. 10b
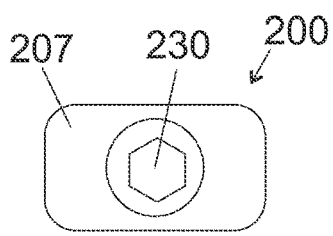
Fig. 10c1
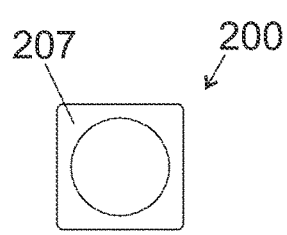
Fig. 10d1
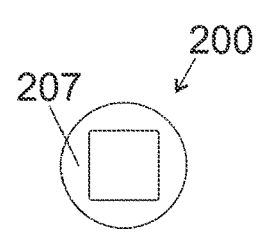
Fig. 10e1
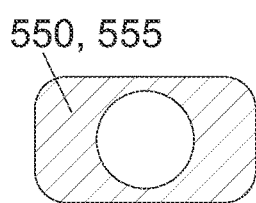
Fig. 10c2
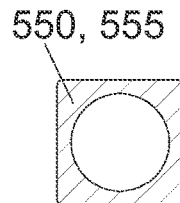
Fig. 10d2
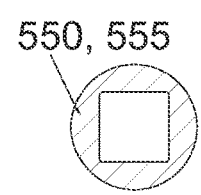
Fig. 10e2

METHOD FOR INSERTING AN INSERT INTO A TIRE

PRIORITY

This application is a U.S. national application of the international application number PCT/FI2019/050432 filed on Jun. 5, 2019, which claims priority of European application 18397518.4 filed on Jun. 8, 2018, the contents of all of which are incorporated herein by reference.

TECHNICAL FIELD

The disclosed solution relates to tires, particularly prefabricated tires, comprising inserts. In particular, the disclosed solution relates to methods for inserting such in inserts into such tires.

BACKGROUND

It is known that inserts, such as studs, may be inserted into tires with robotized or automatized means such as those based on a so-called 'stud gun'. With such known methods, in addition to inserts being subjected to notable impacts during their insertion, inserts need to be firmly gripped before and during inserting the inserts into their installation holes.

Such means subject an insert to notable gripping and/or impact forces, which creates the risk of creating surface and/or structural damage to the insert.

In particular, such damage risks are especially pronounced in the case of inserts for 'smart' tires. This is because inserts that are typically required in 'smart' tires usually comprise electronic components or are otherwise more fragile than metal- and/or ceramics-based friction-increasing inserts typically used in studded tires.

Such 'smart' tires may comprise various inserts with variable functionality—such as measuring wear, friction, moisture and acceleration—shape, dimensioning and positioning in the tire.

It is the aim of the disclosed solution to address and alleviate the above-mentioned problems associated with inserting inserts—especially inserts that comprise electronic components or which are otherwise particularly fragile.

SUMMARY

The aim of the disclosed solution is to present a method of inserting inserts into tires such that the inserts—particularly fragile inserts such as those comprising electronic components—may be protected against gripping and impact forces during their insertion.

The disclosed solution is premised on an insert being housed, at least partially, in a sleeve upon and during its installation into a tire. Thus, the sleeve may be employed to provide protection for the insert against gripping and/or impact forces during the insertion of the insert into a tire.

Specifically, the disclosed solution comprises a method for inserting an insert to a tread of a tire. According to the method, first is arranged available the insert and the tire comprising tread blocks forming the tread of the tire. Therein, the insert extends in a longitudinal direction from a bottom of the insert to the top of the insert and has a first cross section at a first longitudinal position from the bottom and a second cross section at a second longitudinal position from the bottom, wherein the first longitudinal position is located closer to the top than the second longitudinal position and the second cross section is greater than the first cross section. Also therein, a tread block has been provided with a blind hole. In an example, the blind hole has a first cross-section at a first depth and a second cross-section at a second depth, wherein the second cross-section is greater than the first cross-section and the second depth is greater than the first depth. According to the method, thereafter, at least a part of the insert is arranged into such a sleeve that is configured to receive at least that part of the insert that has the first cross section and support at least that part of the insert that has the second cross section in the longitudinal direction and/or a transversal direction that is perpendicular to the longitudinal direction. Then, the insert is arranged to the blind hole such that such that the bottom of the insert is inserted deeper in the blind hole than the top of the insert.

According to the disclosed solution, to provide a protective fit of an insert to a sleeve, preferably a part of the sleeve is geometrically congruent with a part of the insert, and more preferably a part of the sleeve is geometrically congruent with such a part of the insert that is left in between the first longitudinal position and the second longitudinal position.

BRIEF DESCRIPTION OF THE DRAWINGS

FIG. 9 illustrates a drill bit according to an example.

FIG. 10a illustrates an insert with a sleeve, as viewed cross-sectionally from a side.

FIG. 10b illustrates an insert with a sleeve, as viewed from above.

FIG. 10c1 illustrates an insert comprising a flange, as viewed from above.

FIG. 10c2 illustrates the insert of FIG. 10c1 with a sleeve, as viewed from above.

FIG. 10d1 illustrates an insert comprising a flange, as viewed from above.

FIG. 10d2 illustrates the insert of FIG. 10d1 with a sleeve, as viewed from above.

FIG. 10e1 illustrates an insert comprising a flange, as viewed from above.

FIG. 10e2 illustrates the insert of FIG. 10e1 with a sleeve, as viewed from above.

The Figures are intended to illustrate the general principles of the disclosed solution. Therefore, the illustrations in the Figures are not necessarily in scale or suggestive of precise layout of system components.

DETAILED DESCRIPTION

Figure 1A:
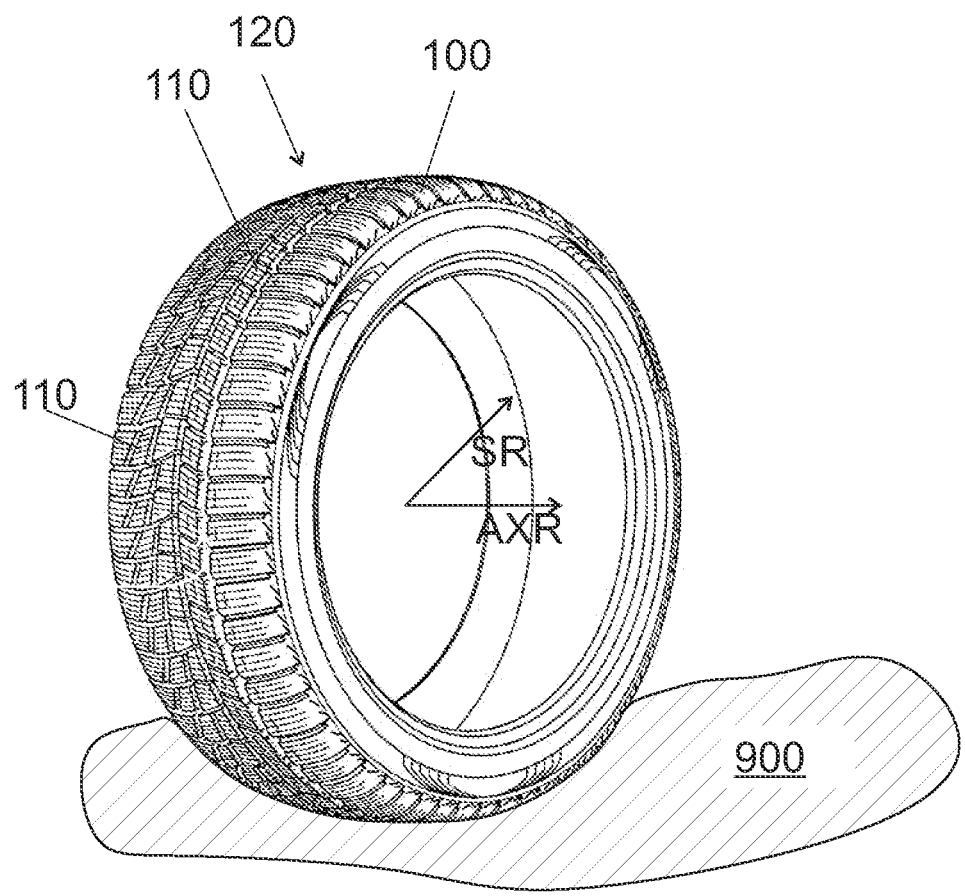
FIG. 1a illustrates a tire.

In the text, references are made to the Figures with the following numerals and denotations:
100 Tire
110 Tread block, of tire
112 Blind hole
112a Bottom, of blind hole
112b Aperture, of blind hole
112c Wall, of blind hole
113 Marking
114 Adhesive
120 Tread, of tire
122 Groove
130 Inner surface, of tire
150 Reinforcing belt
155 Ply
200 Insert
202 Bottom, of insert
204 Top, of insert
205 Side, of insert
207 Flange, of insert
210 Primary capacitive component
220 Primary inductive component
230 Hard metal pin
235 Supportive flange
240 Sensor
300 Interrogator
310 Communication circuit
320 Secondary inductive component
330 Power source
340 Sensor
400 Drill bit
410 Shaft, of drill bit
420 Protrusion, of drill bit
430 Flange, of drill bit
450 Part, of drill bit shaft
500 Tool
502 Jaw, of tool
504 Jaw, of tool
510 Cylinder
512 Punch
514 Rod
550 Sleeve
555 Wall, of sleeve
560 First aperture, of sleeve
565 Cavity, of sleeve
570 Second aperture, of sleeve
600 Position sensor
900 Surface
α Angle
A1 First cross section, of insert
A2 Second cross section, of insert
A3 First cross section, of sleeve
Amax Maximal cross-sectional area, of insert
AXR Axial direction
C1 First cross section, of blind hole
C2 Second cross section, of blind hole
$d_{112}$ Depth, of blind hole
$d_{150}$ Distance, between tread and reinforcing belt
de1 First depth, in blind hole
de2 Second depth, in blind hole
N1 Normal, of tread
Pmax Plane of maximum cross section
r1 First longitudinal position, in insert
r2 Second longitudinal position, in insert
SR Radial direction
$t_{555}$ Thickness, of sleeve wall
z200 Longitudinal direction Referring to FIG. 1a, the disclosed solution relates to a tire 100. Such a tire 100 may be pneumatic and/or prefabricated.

As a terminological clarification, and as readily appreciated by a person skilled in the art, a prefabricated tire 100 means a tire 100 which has been manufactured, i.e. fabricated, and could be used already as such without additional furnishings such as those described below. Such a prefabricated tire 100 may be, for example, a vulcanized tire 100, but may be prefabricated in another way as well.

Such a 100 tire may be, for example, a tire 100 for a passenger vehicle, such as a passenger car or a motorcycle. Such a tire 100 may be, for example, a so-called heavy tire, for a heavy machine such as a truck, a caterpillar, a harvester or a front loader. Such a tire 100 may be a tire for use on slippery surfaces, such as a winter tire.

Such a tire 100 typically comprises a tread 120, which is in contact with a surface 900, such as a road surface, during the normal use of the tire 100. Such a tread 120 typically comprises a tread pattern which comprises a plurality of tread blocks 110. Such tread blocks 110 typically are surrounded by grooves 122.

The material of the tread blocks 110, or at least the tread block 110 in which an insert 200 is installed in accordance with what is described below, may have a Shore hardness of from 50 ShA to 80 ShA. Such hardness may be measured, for example, according to ASTM standard D2240, version 15e1. According to an example, the tread block(s) 110 have such a Shore hardness at a temperature of 23° C.

As is known, a tire 100 may rotate around an axis of rotation AXR, in which case an outward centrifugal force acts on the constituent parts of the tire 100 along a radial direction SR.

Figure 1B:
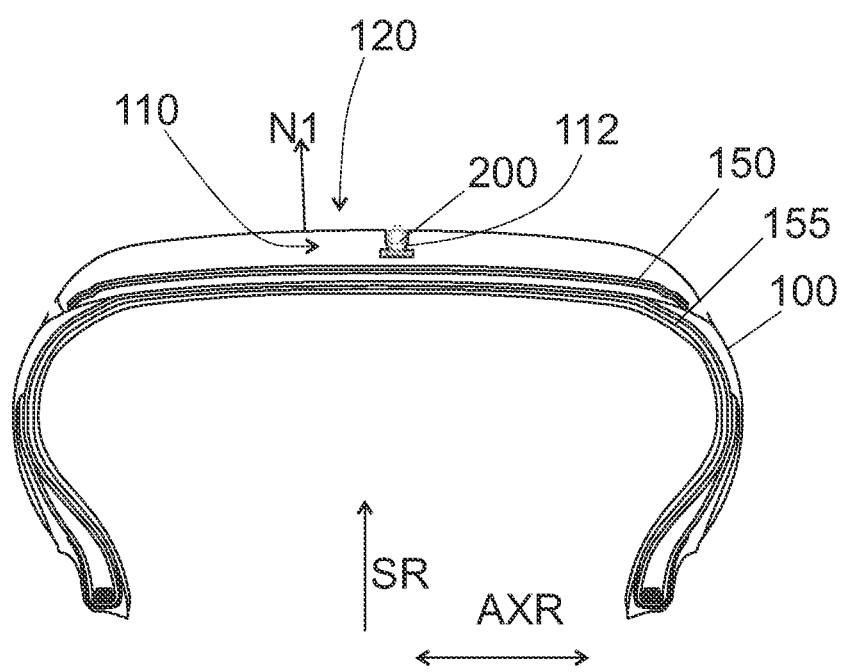
FIG. 1b illustrates, in a half cross section, a tire comprising an insert in a blind hole.
Figure 1C:
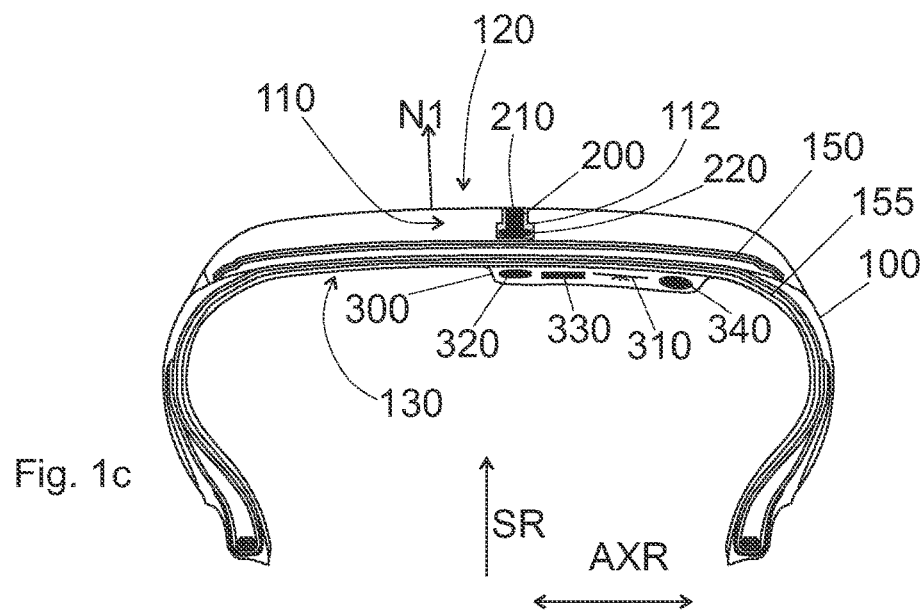
FIG. 1c illustrates, in a half cross section, a tire comprising an insert in a blind hole, and an interrogator.

As is typical for certain types of tires 100, and as is illustrated in FIGS. 1*b*-1*c*, the tire 100 may comprise a reinforcing belt 150 arranged between the tread 120 and the inner surface 130 of the tire 100.

According to the disclosed solution, such a tire 100 may be equipped with an insert 200. Such an insert 200 may be, for example, a friction-increasing stud as is typical in winter tires. As another example, such an insert 200 may be configured to sense a measure of interest such as the wear of the tread 120 of the tire 100. As yet another example, such an insert 200 may combine the above-mentioned capabilities of a stud and sensing a measure of interest.

Correspondingly, the disclosed solution comprises a method for inserting an insert 200 into a tread 120 of a tire 100, preferably a prefabricated tire 100.

A tire 100 may comprise one or more inserts 200. Such inserts 200 may be of one or more different types.

FIGS. 2*a*-2*i* illustrate examples of inserts 200 in accordance with the disclosed solution.

Figure 2A:
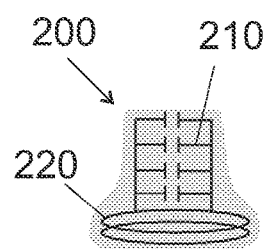
FIGS. 2a-2i illustrate inserts according to examples.

As illustrated in FIG. 2*a*, an insert 200 may comprise a primary capacitive component 210 and a primary inductive component 220, for example to enable communication with an interrogator 300. As illustrated in FIG. 2*f*, such an insert 200 may comprise a flange 207. If the insert 200 is arranged to sense the wear of the tread 120 for example, the secondary capacitive component 210 may wear with the tread 120 as a consequence of the insert 200 having been inserted into the tread 120, whereby the sensing of the wear of the tread 120 may be premised on the wear-induced change in the capacitance of the capacitive component 210. In view of the preceding, the insert 200 may, thus, be configured to measure a condition, such as wear, of the tire 100.

With reference to FIG. 1*c*, in case a tire 100 comprises an insert 200 configured to sense a measure of interest, the tire 100 may comprise an interrogator 300 configured to communicate with the insert 200. Such an interrogator 300 may be attached to the inner surface 130 of the tire 100. Such an interrogator 300 may comprise a power source 330, preferably an electric power source 330, to provide electricity for powering the functionality of the interrogator 300 and a communication circuit 310 to perform measurements and communication to external device(s) (not depicted). Typically, the power source 330 is a battery configured to provide electricity by converting chemical energy into electricity. Alternatively or in addition, the power source 330 may comprise an energy harvesting device, such as a piezoelectric energy harvesting device or a triboelectric energy harvesting device, which device may comprise a battery and/or a capacitor as one of its elements.

For the purposes of communication between an insert 200 and an interrogator 300, the insert 200 may comprise a primary inductive component 200 and a primary capacitive component 210—as is illustrated in FIGS. 2*a* and 2*f* for example—and the interrogator 300 may comprise a secondary inductive component 320. In such a case, the communication between the insert 200 and the interrogator 300 may arise from the secondary inductive component 220 being capable of transforming magnetic energy into electricity, which becomes temporarily stored in a primary capacitive component 210. Such magnetic energy may originate from a primary inductive component 320 of the interrogator 300. The interrogator 300 may thereby comprise an energy source, such as a power source 330, for example a battery, to provide energy for the components and functioning of the interrogator 300, including an inductive component 320. Consequently, the interaction between the passive circuit 200 and the interrogator 300 may be premised on the mutual inductance of the secondary inductive component 220 and the primary inductive component 320. That is, the primary inductive component 320 and the secondary inductive component 220 may be in an electromagnetic connection with each other.

Figure 2B:
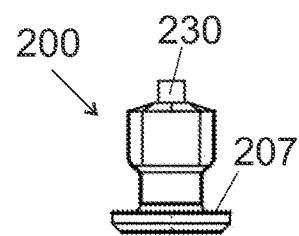

As illustrated in FIG. 2*b*, an insert 200 may comprise a hard metal pin 230 at that end of the insert 200 which is configured to be in contact with a surface 900. An insert 200 thusly equipped with a hard metal pin 230 may also comprise a flange at or towards the other end of the insert 200. Thus, an insert 200 may be configured to improve the friction of the tire 100.

Figure 2C:
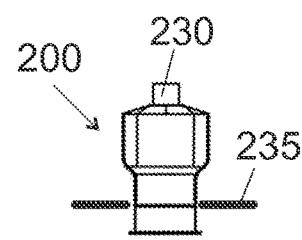

As illustrated in FIG. 2*c*, an insert 200 comprising a hard metal pin 230 may comprise a supportive flange 235 movably connected to the body of the insert 200. Such a supportive flange 235 may therefore be configured to allow the insert 200 to move relative to supportive flange 235, i.e. have some travel through but without becoming separated from the supportive flange 235. With such a configuration, the pressing force of hard metal pin 230 against the surface 900 may be controllably reduced, and consequently the wear of the surface 900 reduced.

Figure 2D:
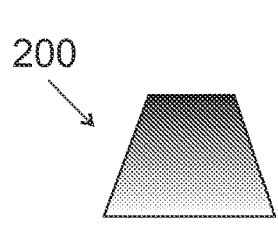
Figure 2E:
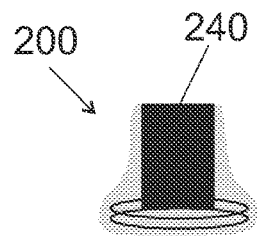
Figure 2F:
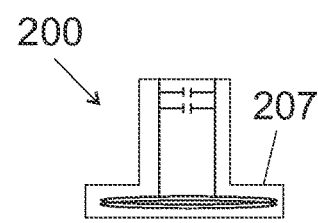
Figure 2G:
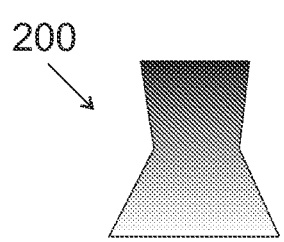

An insert 200 may be configured to indicate a condition, such as wear, of the tire 100. Towards such an end, as illustrated in FIGS. 2*d* and 2*g*, an insert 200 may, for example, be variably colored along the vertical dimension of the insert 200. With such variable coloring, the degree of wear of the insert 200 may be visually observed based on the color of the insert 200. As illustrated by FIGS. 2*d* and 2*g*, such a variably colored insert 200 may comprise, with respect to its vertical cross section, a conical shape or a double-conical shape, or another geometrical shape.

An insert 200 may be configured to measure an environmental parameter, such as humidity or friction. Towards such an end, as illustrated in FIG. 2*e*, an insert 200 may comprise a sensor 240 for the purpose. In such a case, the insert 200 may also comprise means, such as a primary inductive component 220, for communicating with an interrogator 300.

Figure 2H:
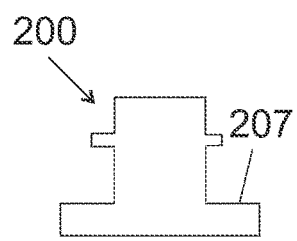
Figure 2I:
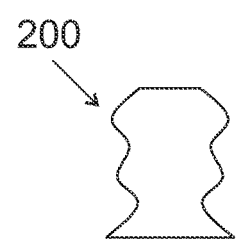

As illustrated in FIGS. 2*h* and 2*i*, an insert 200 may comprise a more complex geometrical shape, which shape may be configured to facilitate the staying of the insert 200 in its installed position in a tread block 110 of a tire, such as in a blind hole 112 in a tread block 110 of a tire. As a specific example of such a more complex geometrical shape, an insert 200 may comprise, with respect to its vertical cross section, two or more flanges vertically separated from each other, as illustrated in FIG. 2*h* in the case of two flanges. As another specific example of such a more complex geometrical shape, an insert 200 may comprise, with respect to its vertical cross section, undulating side walls, as illustrated in FIG. 2*i*.

Figure 3A:
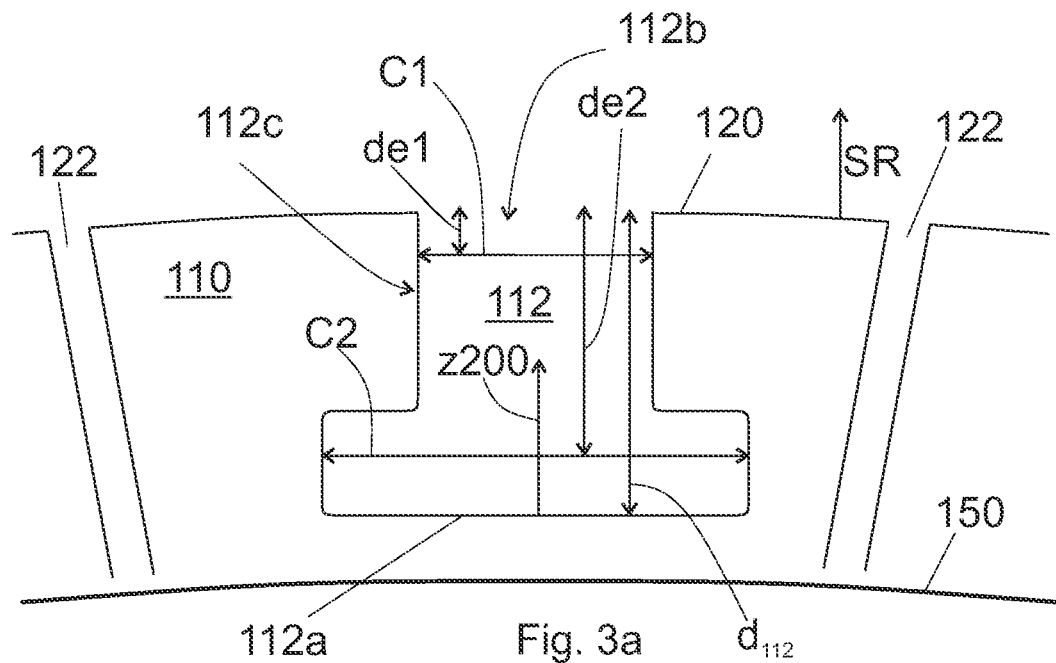
FIG. 3a illustrates a blind hole in a tread block of a tire, as viewed cross-sectionally from a side.

Now referring to FIG. 3a, according to the disclosed solution an insert 200 is inserted to a tread 110 block of a tire 100, preferably a prefabricated tire 100. Towards that end, after arranging available a tire 100 comprising tread blocks 110 forming the tread 120 of the tire 100 and arranging available the insert 200, a blind hole 112 may be machined to a tread block 110 of the tire, if the tire 100 is not already provided with such a blind hole 112. According to the disclosed solution, the insert 200 may be inserted to the blind hole 112.

In case the tire 100 is a pneumatic tire 100, the tire 100 may be inflated at the time of machining to the blind hole 112, if the tire 100 is not already provided with such a blind hole 112.

In case the tire 100 does not already comprise such a blind hole 112, it may be manufactured to the tread block 110 by drilling, for example. Herein, by drilling is referred to cutting a hole with a rotary cutting implement. Below, such a rotary cutting implement is also referred to as a drill bit 400.

Still referring to FIG. 3a, such a blind hole 112 extends, from its bottom 112a to an aperture 112b in the tread block 110, in a longitudinal direction z200, the longitudinal direction z200 being parallel to or forming an angle $\alpha$ of at most 75 degrees with a radial direction SR of the tire at the location of the blind hole 112.

According to an example, a blind hole 112 is a hollow of revolution, i.e. a hollow space in a shape of a solid of revolution. In such a case, the revolution is around the longitudinal direction z200.

Still referring to FIG. 3a, between the bottom 112a and the aperture 112b, the blind hole 112 is delimited by wall(s) 112c. According to an example, the wall(s) 112c may define a cylindrical or an essentially cylindrical blind hole 112.

According to another example, and as seen in FIG. 3a, the wall(s) 112c may be non-linear in terms of its/their vertical progression. That is, according to this example, a blind hole 112 has a first cross section C1 at a first depth de1 and a second cross section C2 at a second depth de2, and those cross sections C1 and C2 may be different from each other. For the purposes of improving the staying of an insert 200 in its installed position in a blind hole 112—especially in the case of an insert 200 comprising a flange 207 at or towards its non-surface 900-facing end—the blind hole 112 may be wider at one depth than at another depth. For example, it may be the case that the blind hole 112 has a first cross section C1 at a first depth de1 and a second cross section C2 at a second depth de2, wherein the second cross section C2 is greater than the first cross section C1 and the second depth de2 is greater than the first depth de1.

Figure 3B:
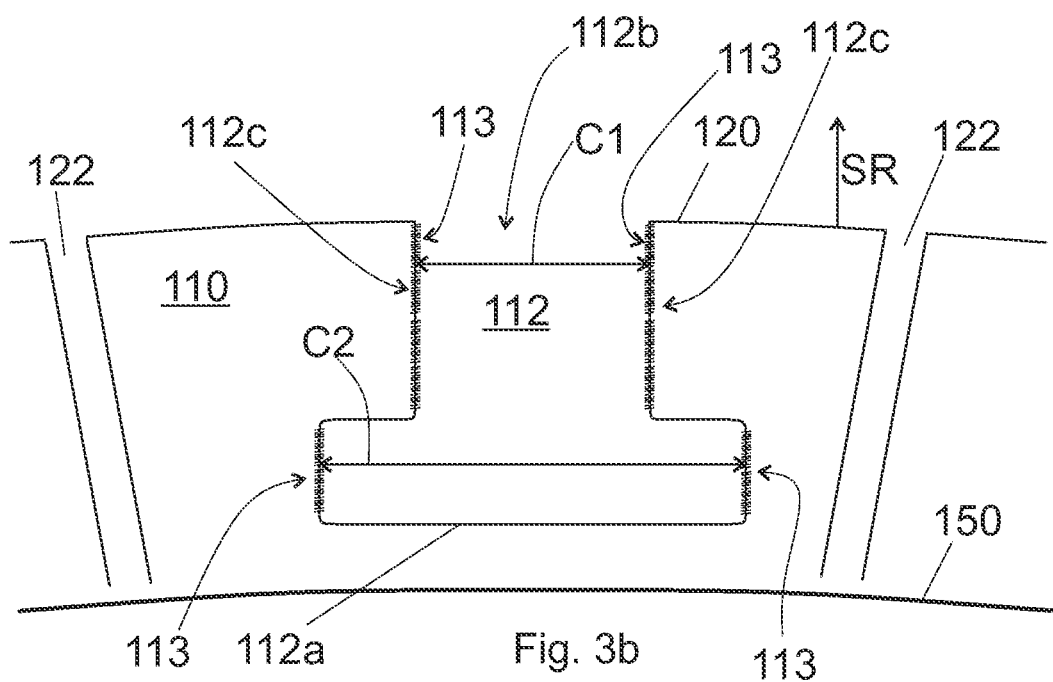
FIG. 3b illustrates, in a tread block of a tire, a blind hole comprising markings on its wall(s), as viewed cross-sectionally from a side.

Now referring to FIG. 3b, according to an example, the wall(s) 112c of the blind hole 112 may comprise a marking 113 or several markings 113 being indicative of the blind hole 112 having been machined to the tread block 110 after the tread block 110 was fabricated, for example vulcanized. Such a marking 113 or markings 113 may be provided upon machining the blind hole 112, i.e. machining the blind hole 112 in such a way that the wall(s) 112c comprise(s) marking(s) 113. In effect, the marking(s) 113 entail that it is possible to discern the blind hole 112 as having been manufactured by machining instead of, for example, with metal bars during fabrication of the tire 100. Such marking(s) 113 may be constituted by, for example, the inherent or controlled resultant roughness brought about the implement with which the blind hole 112 is manufactured.

Figure 5A:
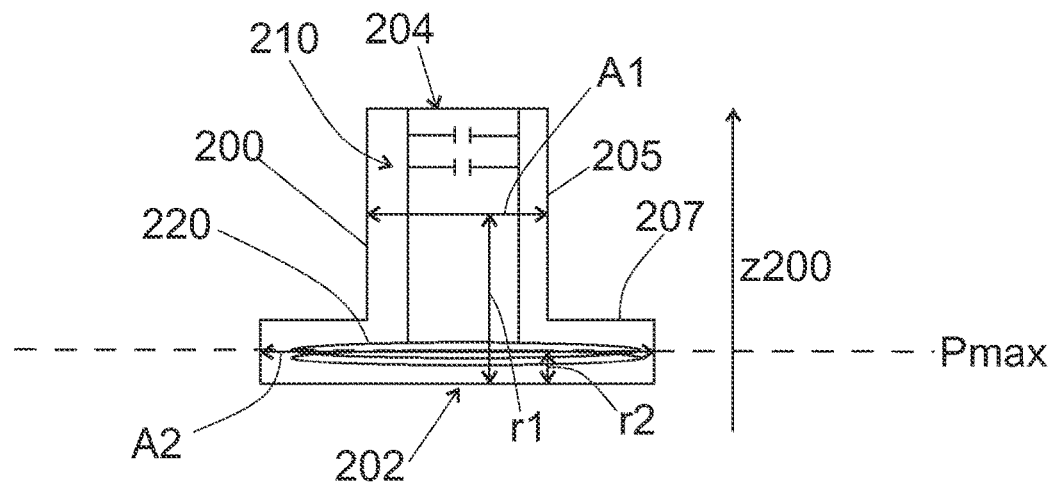
FIG. 5a illustrates a insert according to an example, as viewed cross-sectionally from a side.
Figure 5B:
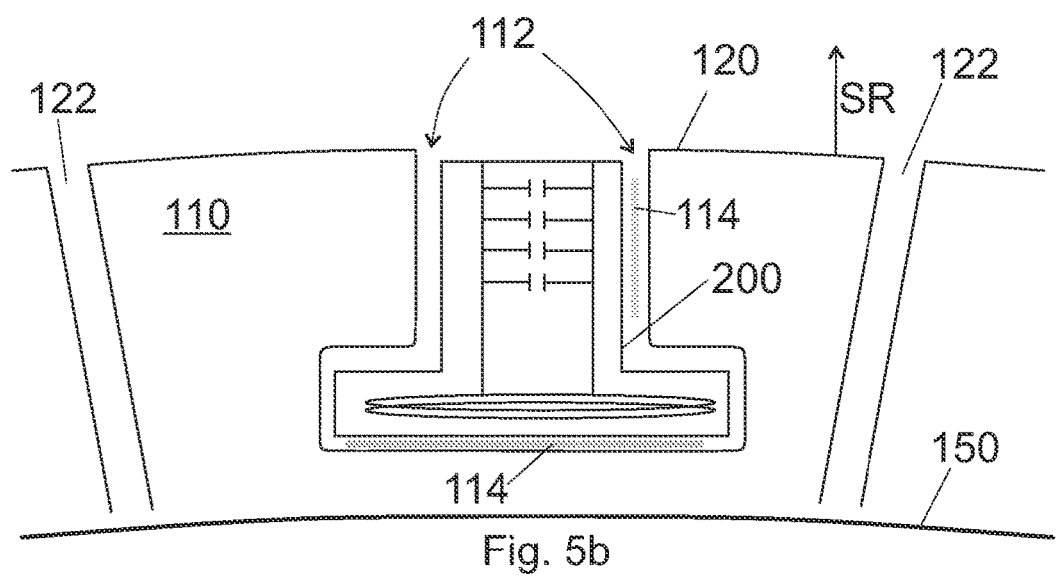
FIG. 5b illustrates an insert in a blind hole according to examples, as viewed cross-sectionally from a side.

Such marking(s) 113 may additionally increase the friction between the blind hole 112 and the insert 200 installed in the blind hole 112 and/or enable greater adhesive force between the blind hole 112 and the insert 200 if adhesive 114 is so used, as in an example illustrated in FIG. 5b. Thus, adhesive 114 may be applied in between the insert 200 and the tread block 110 in order to improve the staying of the insert 200 in its installed position in the blind hole 112. For example, adhesive 114 may be applied at least between a bottom 202 of the insert and a bottom 112a of the blind hole 112.

Figure 4A:
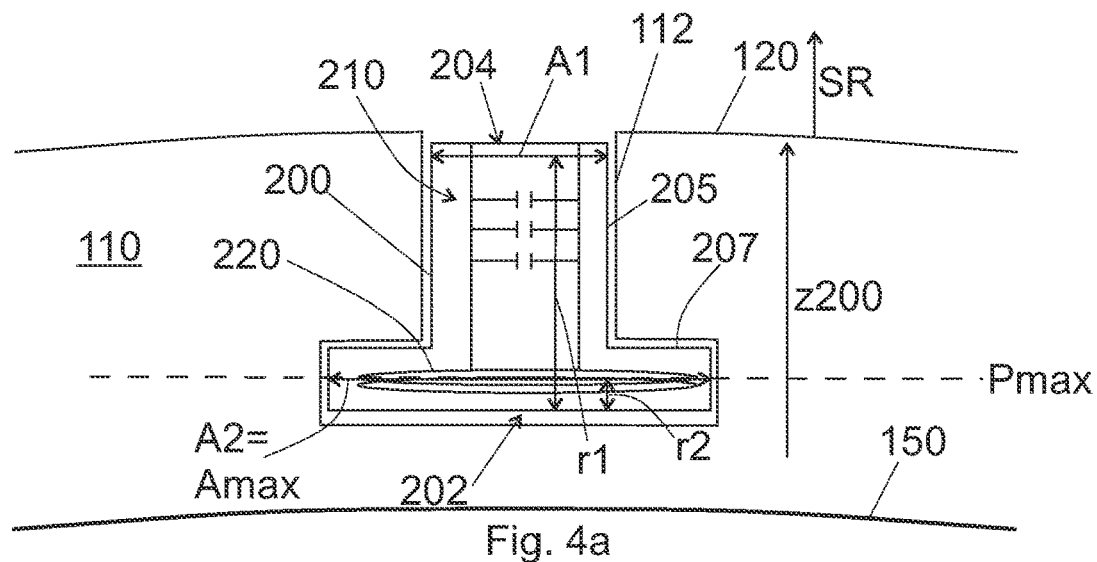
FIGS. 4a-4c illustrate an insert in a blind hole according to examples, as viewed cross-sectionally from a side.

Now referring to FIG. 4a, according to the disclosed solution, the insert 200 extends in a longitudinal direction z200 from a bottom 202 of the insert 200 to a top 204 of the insert 200. Furthermore, the insert 200 comprises a side wall 205 or side walls 205 between its top 204 and its bottom 202. Further still, the insert 200 has a first cross section A1 at a first longitudinal position r1 from the bottom 202 and a second cross section A2 at a second longitudinal position r2 from the bottom 202, wherein the first longitudinal position r1 is located closer to the top 204 than the second longitudinal position r2 and the second cross section A2 is greater than the first cross section A1.

Such an insert may be installed in a cylindrical or an essentially cylindrical blind hole 112—noting that the walls 112c of the blind hole 112 typically are elastic—or in a blind hole 112 in which the wall(s) 112c of the blind hole 112 are non-linear in terms of its/their vertical progression, as illustrated in FIG. 4a.

According to an example, and preferably if a blind hole 112 is a hollow of revolution, the insert 200 is a solid of revolution.

Nonetheless, preferably the insert 200 and the blind hole 112 receiving the insert 200 are substantially of the same geometrical shape. That is, preferably, the blind hole 112 in a tread block 110 is such that the shape of the blind hole 112 is geometrically congruent with the insert 200. As a consequence, the staying of the insert 200 in its installed position in the blind hole 112 may be improved as there is uniform and little to no clearance between the insert 200 and the blind hole 112. It is to be appreciated that in the case the insert 200 and the blind hole 112 being substantially of the same geometrical shape, the blind hole 112 may, in some cases, be smaller than the insert 200 in terms of the volume of the blind hole 112, as the material composition of its wall(s) 112c and its bottom 202 allow the blind hole 112 to stretch and thereby increase in volume.

Consistently with the foregoing, the insert 200 may be inserted into the blind hole 112 such that the bottom 202 of the insert 200 is inserted deeper in the blind hole 112 than the top 204 of the insert 200.

Figure 4B:
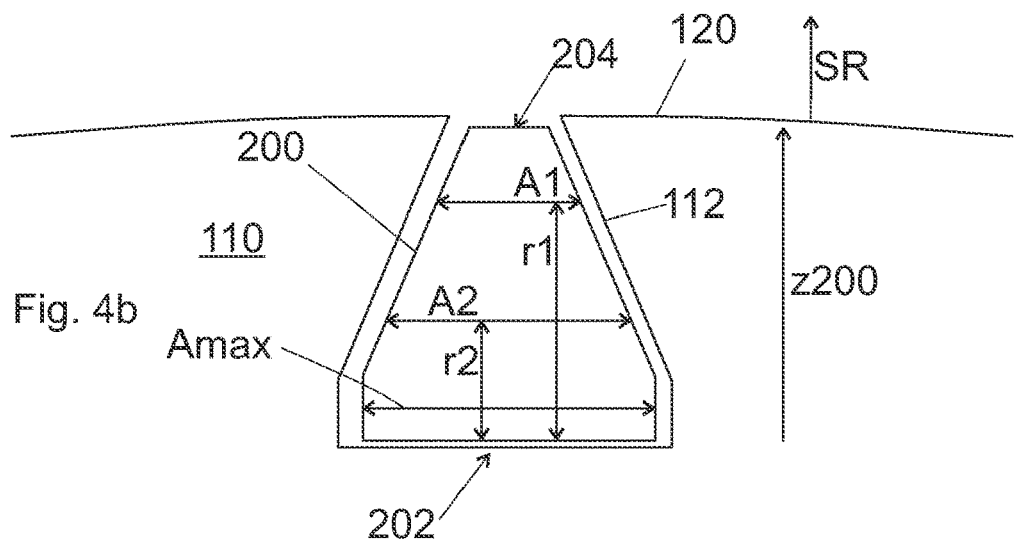
Figure 4C:
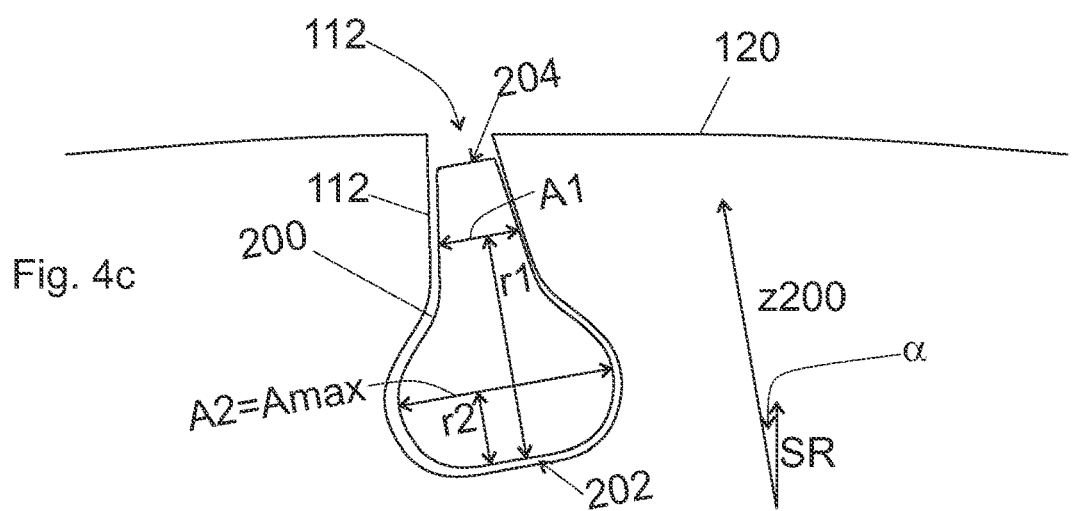

As noted above, the insert 200 may comprise a flange 207 which is wider than the rest of the insert 200 such that the flange 207 resides at or towards the non-surface 900-facing end of the insert 200. The flange 207 may be located such that it resides on the plane on which the cross section of the insert 200 is at its greatest—i.e. on the plane of maximum cross section Pmax there is the maximal cross-sectional area Amax for the insert 200. However, the maximal cross-sectional area Amax need not correspond to a specific flange 207 as illustrated according to examples in FIGS. 4b-4c.

Figure 6A:
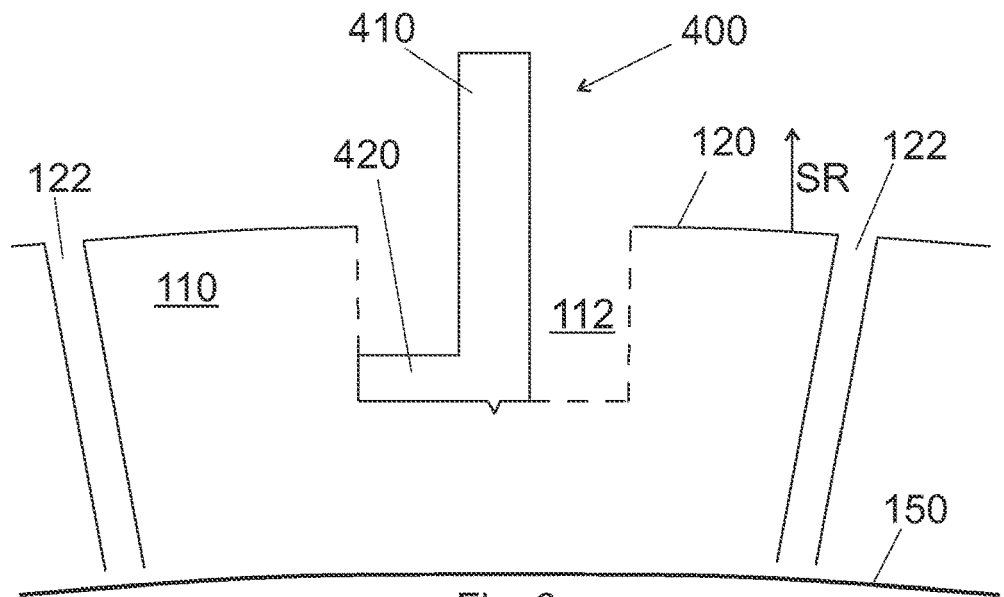
FIGS. 6a-6c illustrate sequentially progressing phases of machining, with a drill bit comprising a protrusion, a blind hole into a tread block of a tire, as viewed cross-sectionally from a side.
Figure 6B:
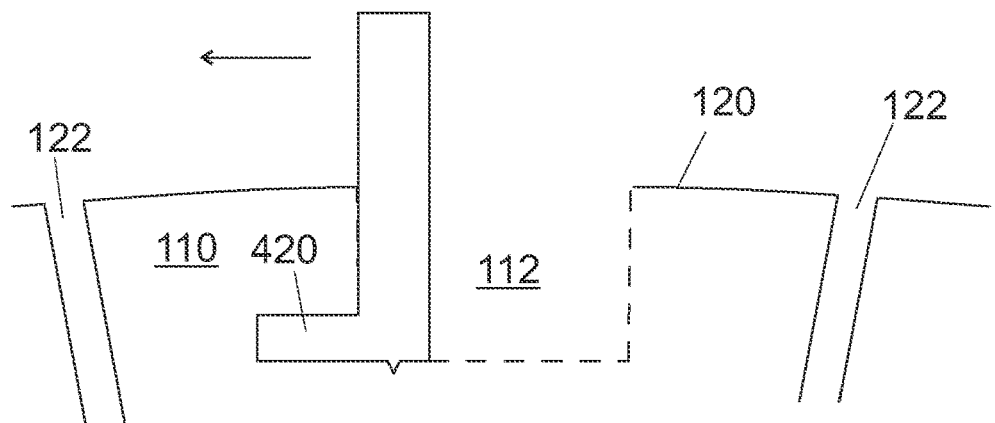
Figure 6C:
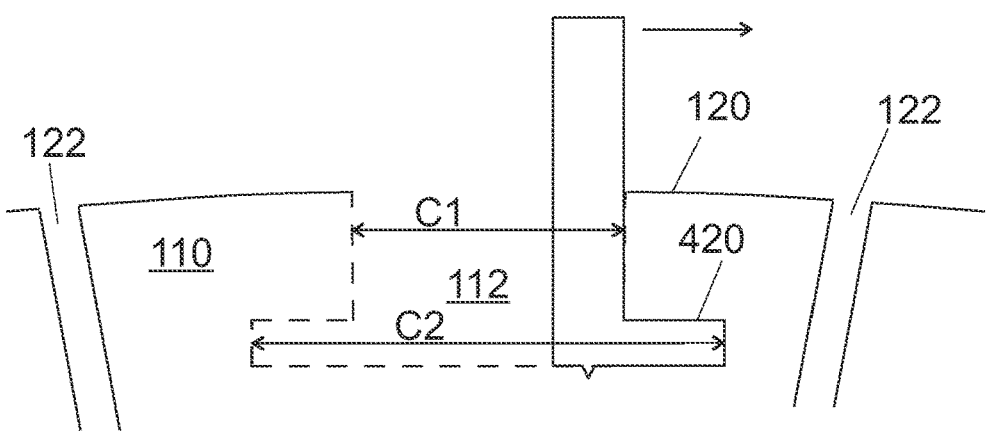

Now referring to FIGS. 6a to 6c, if a tire 100 does not already comprise a blind hole 112 in accordance with the above, such a blind hole 112 may be machined to a tread block 110 of a tire 100 by drilling by using a drill bit 400 that comprises a shaft 410 extending in a longitudinal direction of the drill bit 400. Furthermore, such a drill bit 400 may comprise a protrusion 420 such as a flange 430—as specifically illustrated in FIG. 9—radially extending from the shaft 410. In such a case, the second cross section C2 of the blind hole 112 may be formed by using the protrusion 420 of the drill bit 400. Thus, as sequentially illustrated in FIGS. 6a to 6c, a drill bit 400 comprising the protrusion 420 may penetrate along the longitudinal direction z200 into the tread block 110 thereby forming the first cross section C1, and thereafter move perpendicularly to the longitudinal direction z200 thereby forming the second cross section C2 with the protrusion 420.

Figure 7A:
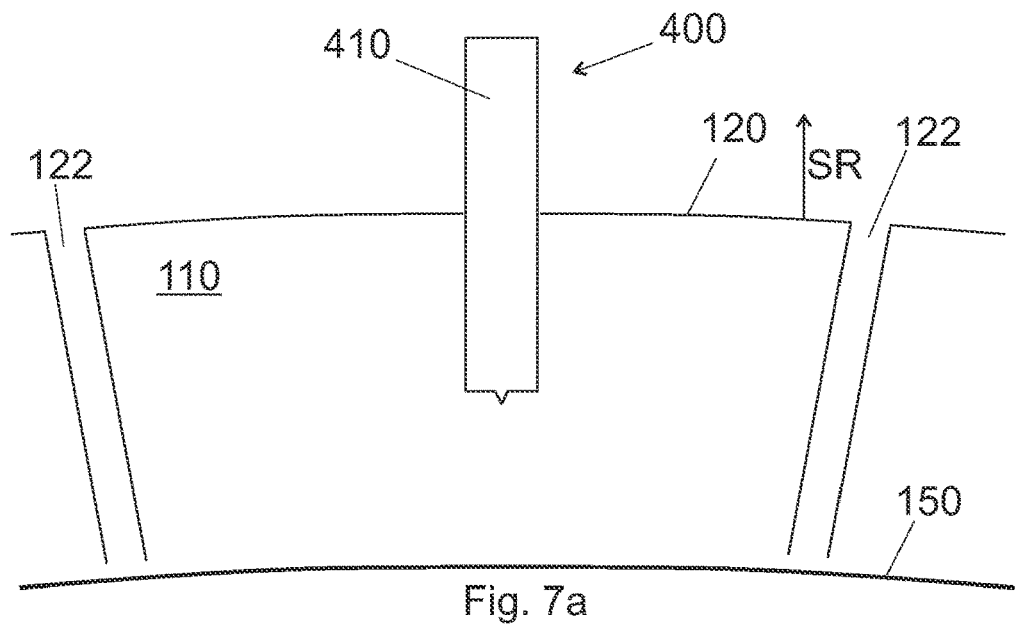
FIGS. 7a-7c illustrate sequentially progressing phases of machining, with a drill bit comprising a radially expanding part, a blind hole into a tread block of a tire, as viewed cross-sectionally from a side.
Figure 7B:
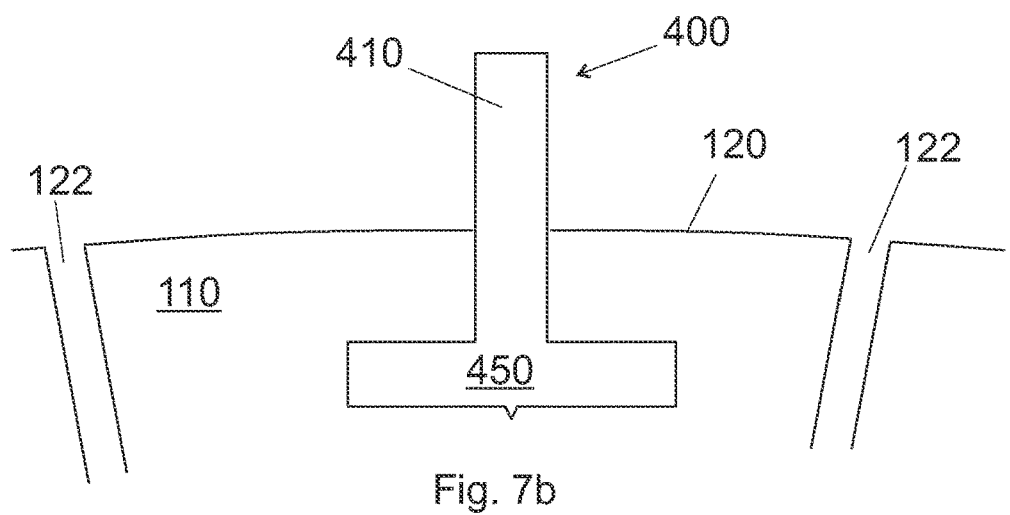
Figure 7C:
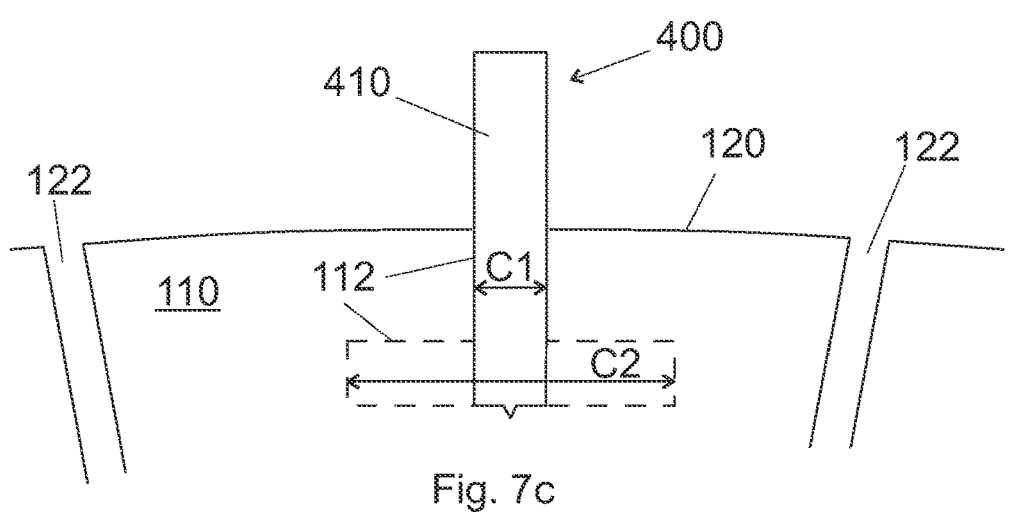

Alternatively or in addition, and now referring to FIGS. 7a to 7c, a blind hole 112 may be machined to a tread block 110 of a tire 100 by drilling by using a drill bit 400 that comprises a shaft 410 extending in a longitudinal direction of the drill bit 400. Furthermore, a part 450 of the shaft 410 of the drill bit 400 may be configured to radially expand in use. In such a case, the second cross section C2 of the blind hole 112 may be formed by using the radially expanding part 450 of the shaft 410. In other words, the cross section C2 of the blind hole 112 may be formed with a diameter-expanding part of a drill bit 400. Thus, as sequentially illustrated in FIGS. 7a to 7c, a drill bit 400 comprising the a radially expanding part 450 may penetrate, with the radially expanding part 450 in a non-expanded state, along the longitudinal direction z200 into the tread block 110 thereby forming the first cross section C1. Thereafter, the radially expanding part 450 may be expanded, whereby the expanded part 450 in an expanded state may form the second cross section C2. And lastly, the drill bit 400 may be withdrawn, with the radially expanding part 450 in a non-expanded state, from the formed blind hole 112.

Figure 8A:
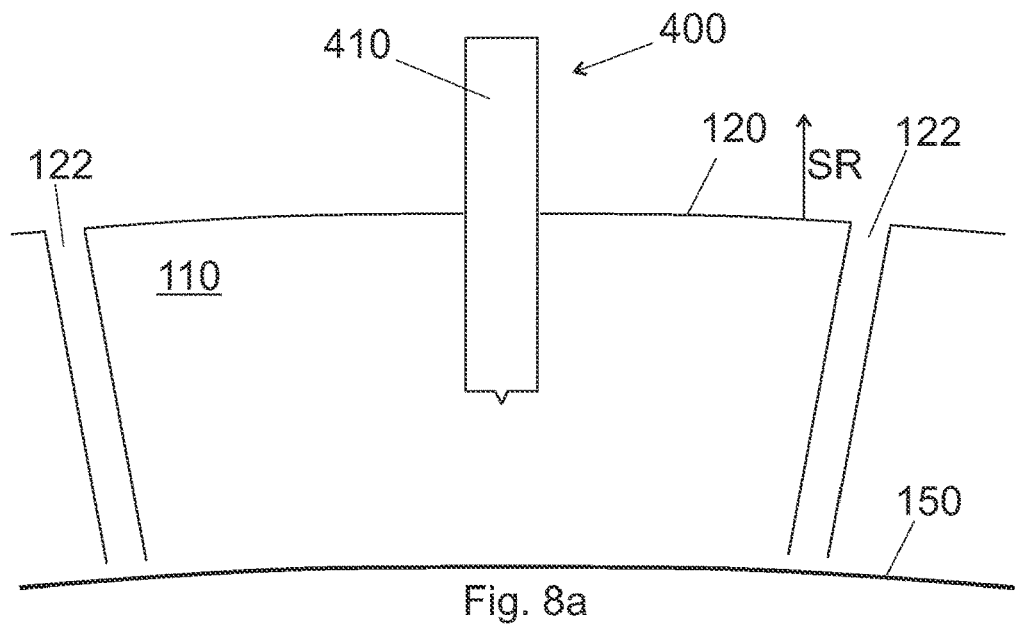
FIGS. 8a-8c illustrate sequentially progressing phases of machining, with a drill bit used in various angles, a blind hole into a tread block of a tire, as viewed cross-sectionally from a side.
Figure 8B:
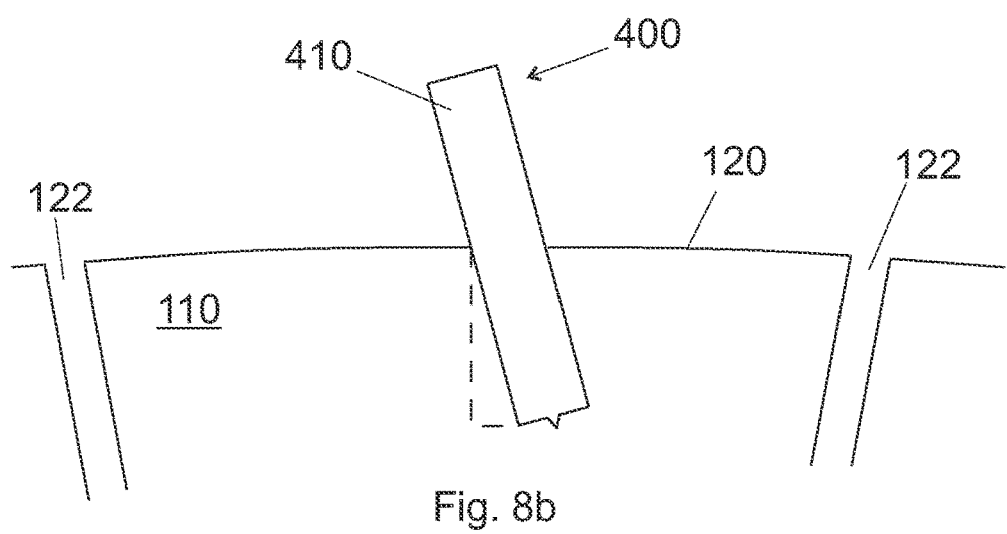
Figure 8C:
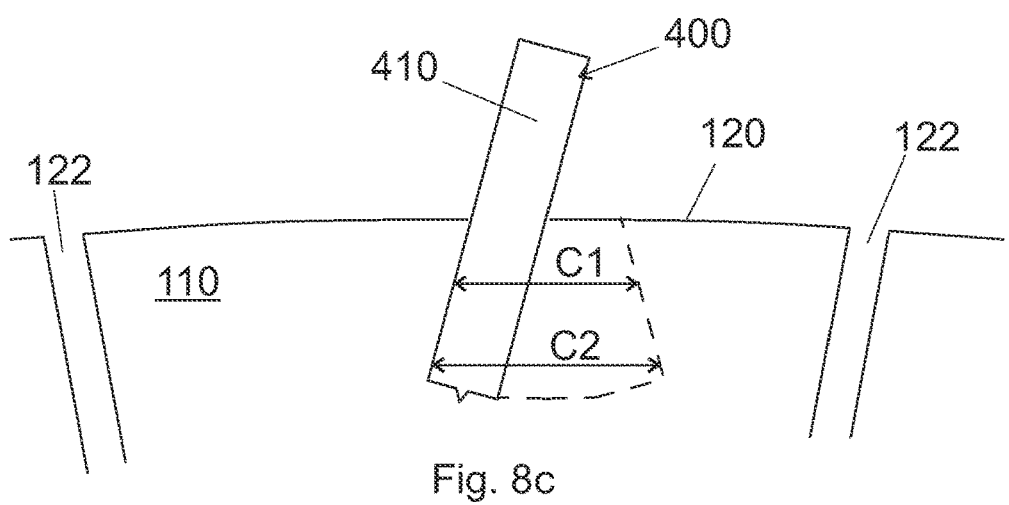

Alternatively, or in addition, and now referring to FIGS. 8a to 8c, a blind hole 112 may be machined to a tread block 110 of a tire 100 by drilling, by using a drill bit 400 comprising a shaft 410, in such a way that the second cross section C2 of the blind hole 112 is made larger than the first cross section C1 by arranging the longitudinal direction of the shaft 410 at various angles relative to a normal N1 of the tread 120. Thus, as sequentially illustrated in FIGS. 8a to 8c, the drill bit 400 may first penetrate along the longitudinal direction z200 into the tread block 100, after which the drill bit 400 may be tilted into various angles in such a manner that the bottom 112a of the blind hole 112 becomes cross-sectionally larger than its aperture 112b. The resulting blind hole 112 may be a hollow of revolution in shape.

Now referring to FIGS. 10a and 10b, before inserting an insert 200 into a blind hole 112, in accordance with what has been described above, an insert 200 or at least a part of the insert 200 is arranged into a sleeve 550.

By arranging the insert 200 or at least a part of the insert 200 into a sleeve 550, the insert 200 may be protected during its insertion into the blind hole 112. For example, the use of a sleeve 550 may ensure the dimensional and shape integrity of the insert 200 during its insertion into the blind hole 112. Thus, the insert 200 may be inserted into the blind hole with the sleeve 550. After such insertion, and as sequentially illustrated in FIGS. 14 and 15a to 15b, the sleeve 550 may be removed from the blind hole 112, with the insert 200 remaining in its installed position in the blind hole 112.

Figure 11A:
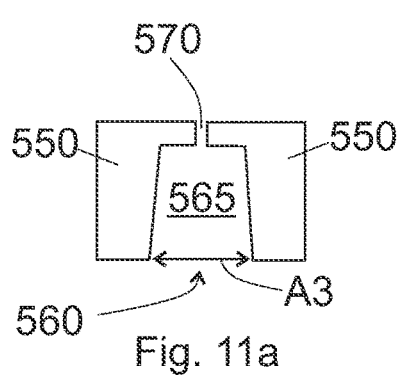
FIGS. 11a-11b illustrate, according to examples, a sleeve, as viewed cross-sectionally from a side.
Figure 11B:
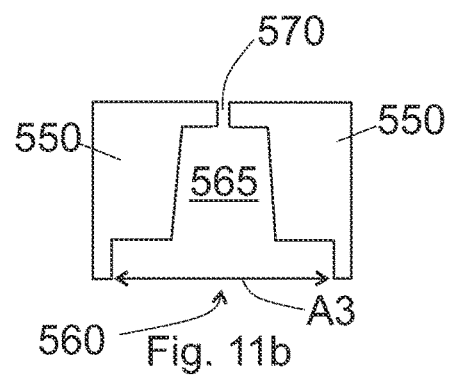

As illustrated in FIGS. 11a and 11b, such a sleeve 550 limits a first aperture 560 for receiving the insert 200 or at least a part of it. Such a first aperture 560 resides at a first end of the sleeve 500 and has a third cross section A3, as denoted in FIGS. 11a and 11b. Furthermore, such a sleeve 550 comprises a cavity 565 for housing the insert 200 or at least a part of it.

In addition, the sleeve 550 may comprise a second aperture 570 at a second, opposite, end of the sleeve 550. In such a case, the first aperture 560 may define a cavity 565 that extends to the second aperture 570. In such a case, the cavity 565 may taper towards the second aperture 570, as is illustrated according to examples in FIGS. 11a to 11b.

Now referring to FIGS. 12a to 12b and 13a to 13b, according to the disclosed solution, at least a part of the insert 200 may be arranged into such a sleeve 550 that is configured to receive at least that part of the insert 200 that has the first cross section A1 and that is configured to support at least that part of the insert that has the second cross section A2 in the longitudinal direction z200 and/or a transversal direction that is perpendicular to the longitudinal direction z200. By doing so, the sleeve 550 may offer support and protection for the insert 200 during the insertion of the insert 200 into a blind hole 112 in a tire 100.

Figure 13A:
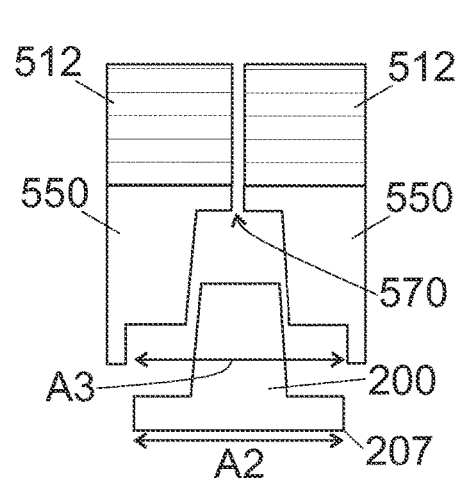
FIG. 13a illustrates an insert and a punch comprising a sleeve, according to an example and as viewed cross-sectionally from a side.
Figure 13B:
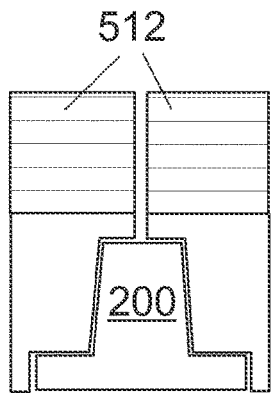
FIG. 13b illustrates a punch comprising a sleeve with an insert in the sleeve, according to an example and as viewed cross-sectionally from a side.

More specifically, as illustrated in FIGS. 13a to 13b, the sleeve 550 and the insert 200 may be configured such that the sleeve 550 limits a first aperture 560 for receiving the insert 200, the first aperture 560 having a third cross-section A3. Therein, the third cross section A3 may be at least as large as the second cross section A2 of the insert 200, whereby preferably the insert 200 may be arranged into the sleeve 550 such that the sleeve 500 laterally surrounds the insert 200, as is illustrated in FIGS. 13a to 13b. In such a case, preferably the outer diameter of the sleeve 550 is greater than the outer diameter of the insert 200 in order to protect the insert 200 from lateral forces such as possible gripping tools gripping the sleeve 550 during installation of the insert 200 within the sleeve 500 into the blind hole 112.

Thus, still referring to FIGS. 13a to 13b, the first cross section A3 of the sleeve 550 may be configured to be at least equal to the second cross section A2 of the insert 200, in which case the whole insert 200 or substantially the whole insert 200 may be housed within the cavity 565 of the sleeve 550, as illustrated in FIG. 13b. In such a case, preferably the geometrical shape of the cavity 565 is substantially congruent with the geometrical shape the insert 200 to be housed within the cavity 565.

Figure 12A:
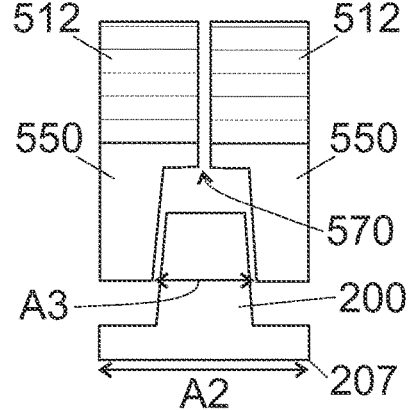
FIG. 12a illustrates an insert and a punch comprising a sleeve, according to an example and as viewed cross-sectionally from a side.
Figure 12B:
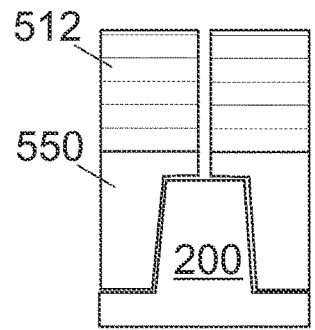
FIG. 12b illustrates a punch comprising a sleeve with an insert in the sleeve, according to an example and as viewed cross-sectionally from a side.

Alternatively, as illustrated in FIGS. 12a to 12b, the sleeve 550 and the insert 200 may be configured such that the sleeve 550 limits a first aperture 560 for receiving a part of the insert, the first aperture 560 having a third cross section A3. Therein, the third cross section A3 may be less than the second cross section A2 of the insert 200, whereby a part of the insert 200 may be arranged into the sleeve 550 such that the sleeve 500 does not laterally surround such a part of the insert 200 that has the second cross section A2, as is illustrated in FIGS. 12a to 12b. In such a case, preferably the outer diameter of the sleeve 550 is greater than the outer diameter of the insert 200 in order to protect the insert 200 from lateral forces such as possible gripping tools gripping the sleeve 550 during installation of the insert 200 into the blind hole 112 within the sleeve 500.

Thus, still referring to FIGS. 12a to 12b, the first cross section A3 of the sleeve 550 may be configured to be less than the second cross section A2 of the insert 200, in which case a part of the insert 200, such as its flange 207, remains outside the cavity 565 of the sleeve 550, as illustrated in FIG. 12b. In such a case, preferably the geometrical shape of the cavity 565 is substantially congruent with the geometrical shape of the part of the insert 200 to be housed within the cavity 565.

As illustrated according to examples in FIGS. 12a to 12c and 13a to 13c, it is advantageous for the above-mentioned supportive and protective functionality of the sleeve 550 that a part of the sleeve 550 is geometrically congruent with a part of the insert 200. In such a manner, said part of the sleeve 550 may more uniformly envelop said part of the insert 200, and therefore better support and protect the insert 200. Specifically, and now also referring to FIGS. 4a to 4c, a part of the sleeve 550 is geometrically congruent with such a part of the insert 200 that is left in between the first longitudinal position r1 and the second longitudinal position r2.

Furthermore, in order to protect the upper end, i.e. the top 204, of the insert 200, when the at least a part of the insert 200 has been arranged into the sleeve 550, advantageously the sleeve 550 extends in the longitudinal direction z200 of the insert 200 at least to the top 204 of the insert 200, and preferably beyond the top 204 of the insert 200.

As illustrated in FIGS. 10a to 10e2, the insert 200 may comprise a flange 207, in which case the sleeve 550 may be configured to support at least the flange 207 when the insert 200 is being inserted into the blind hole 112. With such a support, the flange 207, for example, may be prevented from deforming such as tilting upwards when the insert 200 is being inserted into the blind hole 112.

Towards such an end, and according to an example, the sleeve 550 may comprise a wall 555, which wall may be configured to laterally surround at least a part of the insert 200. Advantageously, the wall 555 is made of metal, ceramic, polymer or composite. Preferably, the thickness $t_{555}$ of the wall 555 is at least 0.3 mm. Thus, upon inserting the insert 200 to a tread 120 of a tire 100, at least a part of the insert 200 may be arranged into the sleeve 550 such that a wall 555 of the sleeve 550 laterally surrounds at least a part of the insert 200 wherein a thickness $t_{555}$ of the wall 555 of the sleeve 550 is at least 0.3 mm.

In other words, and as illustrated in FIGS. 10a and 10b, in case the insert 200 comprises a flange 207, the wall 555 of the sleeve 550 may surround that part of the insert 200 which does not constitute the flange 207. That is, the insert 200 minus the flange 207 may reside inside the sleeve 550 during the installation of the insert 200 into the blind hole 112. In such a case, advantageously the thickness $t_{555}$ of the wall 555 of the sleeve 550 corresponds to or preferably exceeds the outward protrusion of the flange 207 so that the flange 207 may gain support from the sleeve 550 during the installation of the insert 200 into the blind hole 112. Furthermore, advantageously the cross-sectional shape of the sleeve 550 corresponds to the cross-sectional shape of the insert 200, also including the possible flange 207, as illustrated according to examples in FIGS. 10c1-2, 10d1-2 and 10e1-2.

According to an example, the insert 200 or at least a part of the insert 200 may be arranged into the sleeve 550 by applying a pulling force. Such a pulling force may be applied, for example, by using suction. For this purpose, the sleeve 550 may comprise (a) conduit(s) and/or (an) aperture(s), such as an second aperture 570 as illustrated in FIGS. 11a to 11b. According to an example, through such a second aperture 570 suction pressure may conveyed from a source of suction pressure (not depicted) into the cavity 565 of the sleeve, which cavity 565 is to house the insert 200 or at least a part of the insert 200.

Figure 16A:
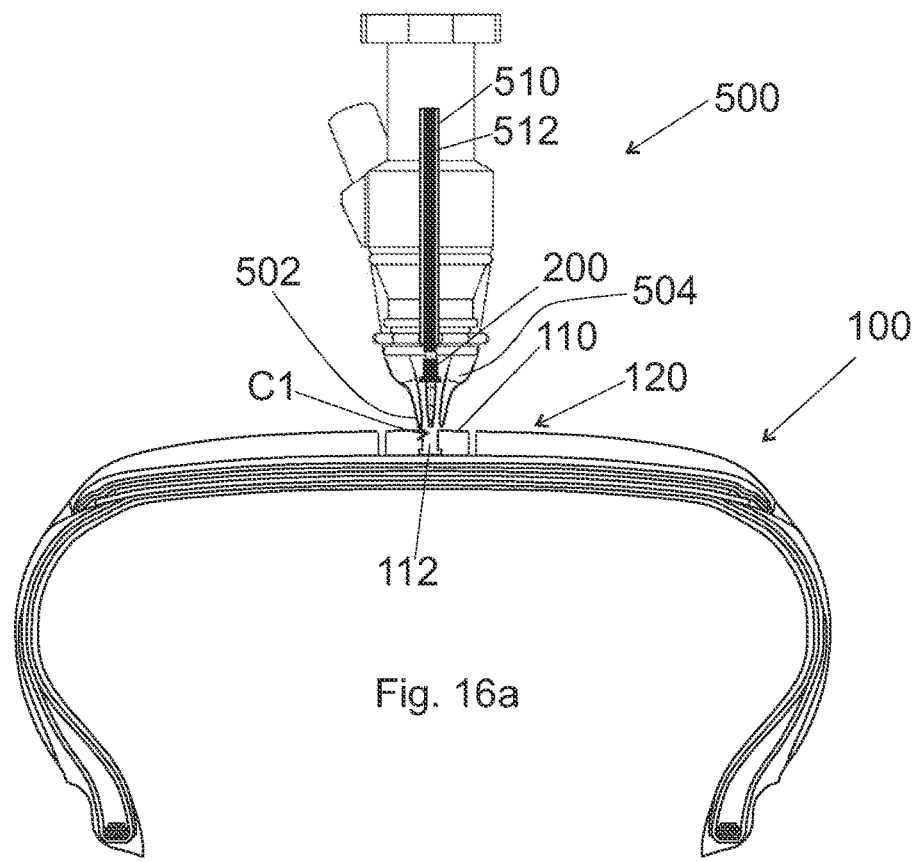
FIGS. 16a-16b illustrate sequentially progressing phases of inserting an insert into a blind hole with a tool, as viewed cross-sectionally from a side.
Figure 16B:
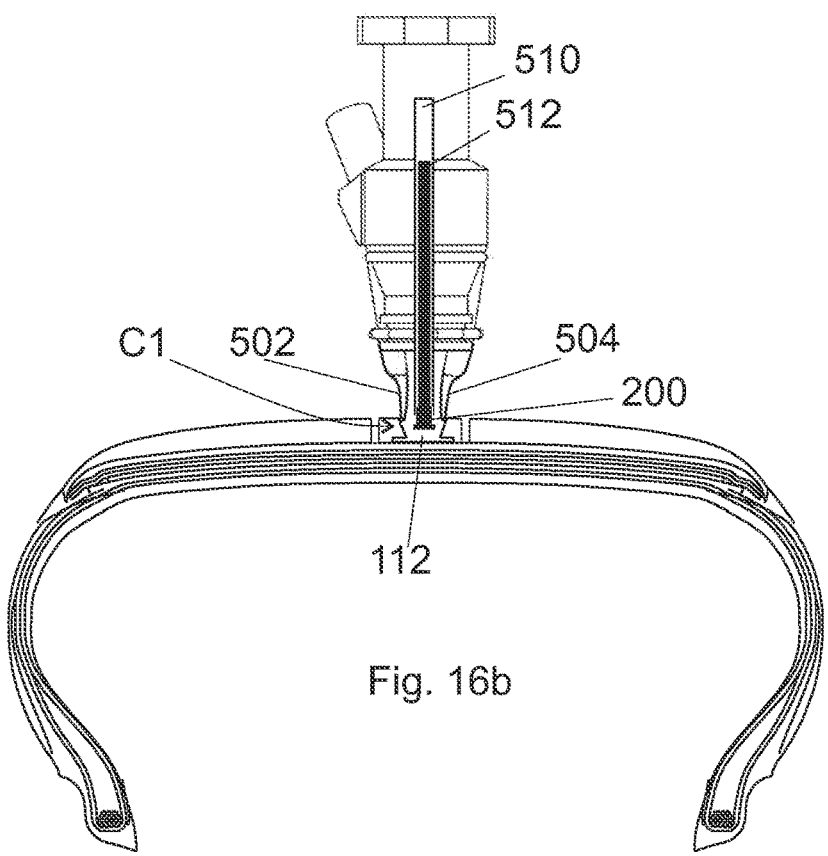
Figure 16C:
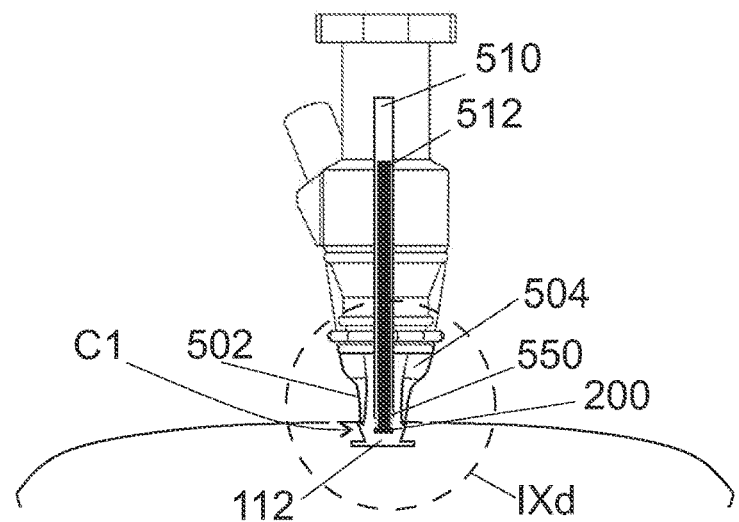
FIG. 16c illustrates, insertion of an insert in a blind hole with a tool, as viewed cross-sectionally from a side.

Now referring to FIGS. 16a and 16b, an insert 200 may be inserted, as arranged into a sleeve 550, into a blind hole 112 such that at least part of the blind hole 112 that has the first cross section C1 is laterally stretched while inserting the insert 200 into the blind hole 112. That is, the blind hole 112 may be stretched wider before and during inserting the insert 200 into the blind hole 112, thus making the insertion of the insert 200 in the sleeve 550 into the blind hole 112 easier. To facilitate such stretching, the material of the tread block 110 comprising the blind hole 112 may have a Shore hardness of from 50 ShA to 80 ShA at a temperature of 23° C.

According to an example, and as illustrated in FIG. 16b, such later stretching may be brought about by using at least three jaws 502, 504. Such jaws 502, 504 may be a part of a tool 500, which tool 500 may also comprise additional functionality, as described below.

As another benefit of the disclosed solution, such lateral stretching may be effected via the a sleeve 550, i.e. a sleeve 550 pushing against the jaws 502, 504 instead of an insert 200 doing so, thereby protecting the insert 200 against jaw-induced damages.

After an insert 200 has been inserted in the into the blind hole 112, the jaws 502, 504—and the sleeve 550—may be removed from the blind hole 112, thereby allowing the tread block 110 to envelop the insert 200 in accordance with what has been described above.

Regardless of whether any jaws 502, 503 are employed in conjunction with inserting an insert 200 within a sleeve 550 into a blind hole 112, the insertion may be facilitated by applying a friction-reducing substance to the sleeve 550 and/or to the blind hole 112. Such friction-reducing substance may also facilitate the removal of a sleeve 550 from a blind hole 112 as illustrated in FIGS. 14 and 15a to 15b.

As a possibility, the sleeve 550 may be arranged to be an integral part of a punch 512, as illustrated in FIGS. 12a to 12c and 13a to 13c. Such a punch 512 may be used to insert the insert 200 into the blind hole 112. As illustrated in FIGS. 16a to 16e, such a punch 512 may be a part of a tool 500 configured to be employed to insert the insert 200 into the blind hole 112, which tool 500 may also comprise the above-described jaws 502, 504.

Figure 16D:
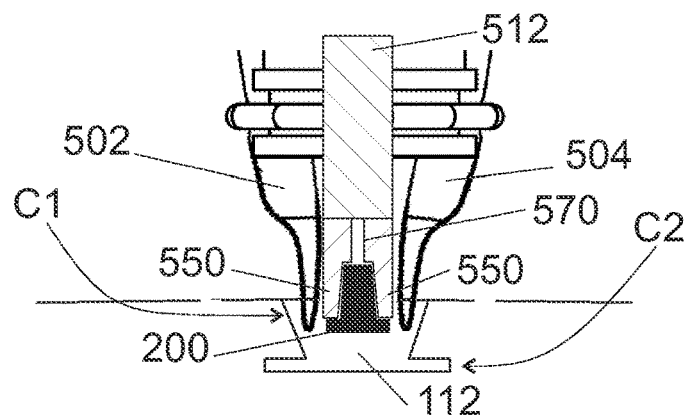
FIG. 16d illustrates, in a close-up, one end of the tool of FIG. 16c with an insert, as viewed cross-sectionally from a side.
Figure 16E:
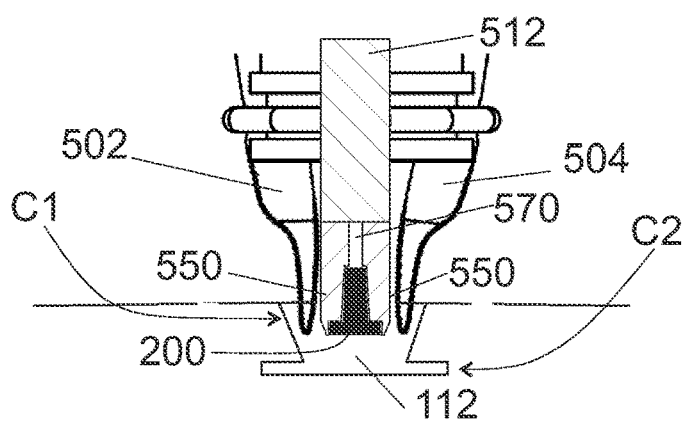
FIG. 16e illustrates, the tool of FIG. 16d, according to an alternative example, with an insert, as viewed cross-sectionally from a side.

If the sleeve 550 is arranged to be an integral part of a punch 512, the sleeve 550 may, consistently with what has been described above, comprise a cavity 565 configured to receive substantially a whole insert 200, as illustrated in FIG. 16e consistently with FIGS. 13a and 13b, or a part of an insert 200, as illustrated in FIG. 16d consistently with FIGS. 12a and 12b.

Figure 12C:
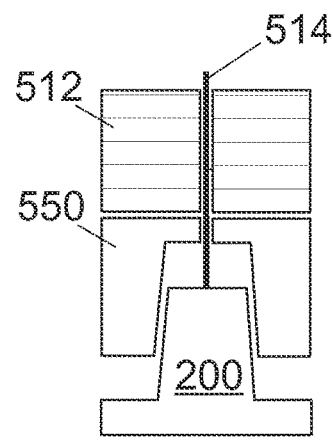
FIG. 12c illustrates, according to an example, expelling an insert form a sleeve with a rod.
Figure 13C:
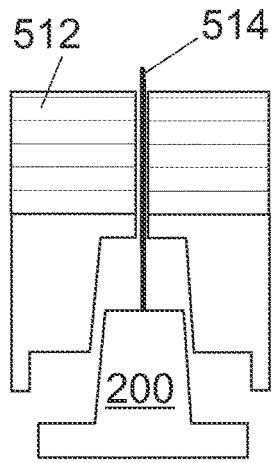
FIG. 13c illustrates, according to an example, expelling an insert form a sleeve with a rod.
Figure 14:
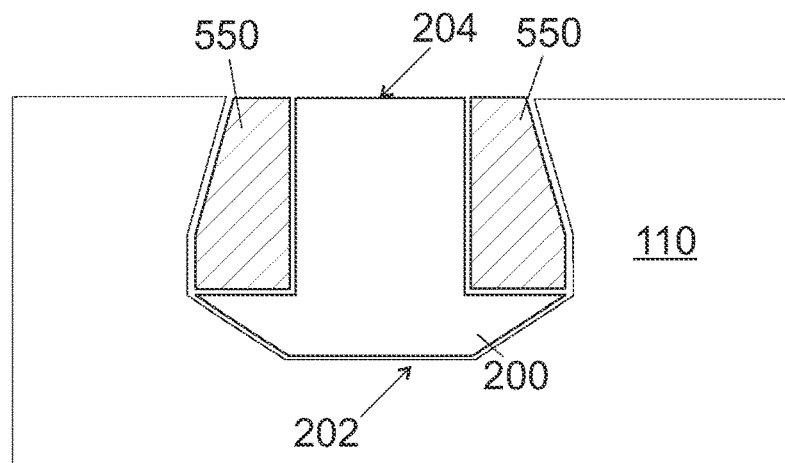
FIG. 14 illustrates, in a blind hole, an insert in a sleeve, as viewed cross-sectionally from a side.
Figure 15A:
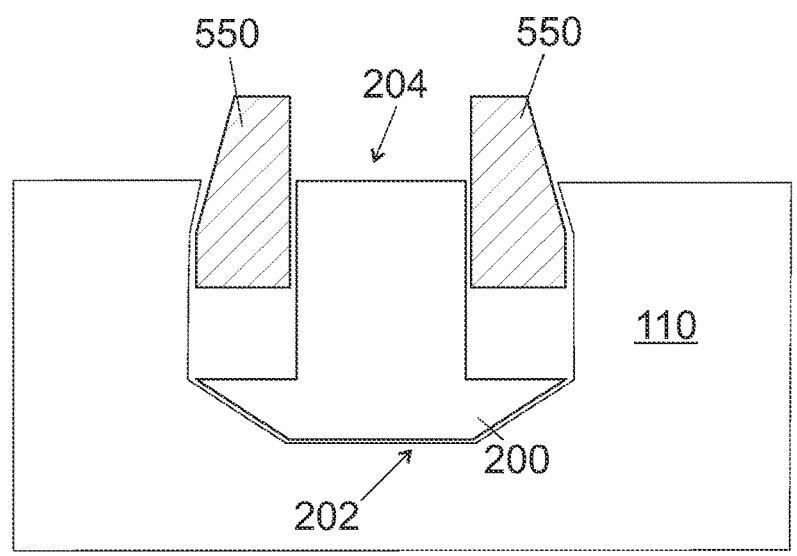
FIGS. 15a-15b illustrate sequentially progressing phases of removing a sleeve from a blind hole such that a sleeve-installed insert remains in the blind hole, as viewed cross-sectionally from a side.
Figure 15B:
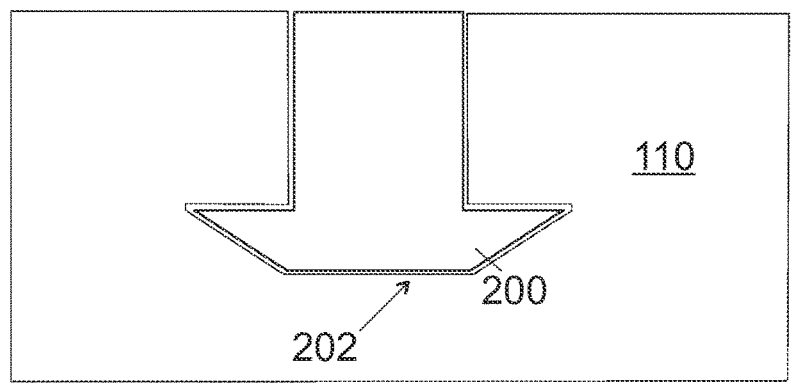

In case the sleeve 550 is an integral part of such a punch 512 that is used to insert the insert 200 into the blind hole 112, the sleeve 550 may be removed from the blind hole 112 after inserting the insert 200 to the blind hole 112 with the sleeve—in accordance with what is illustrated in FIGS. 14 and 15a to 15b. In doing so, according to examples and in accordance with what is illustrated in FIGS. 12c and 13c, the insert 200 may be expelled from the sleeve 550, or such expelling may be facilitated, by using a rod 514, which rod 514 may push the insert 200 out of the sleeve 550. Alternatively or in addition, pressurized gas can be used for the same expelling purpose. Thus, for the purposes of such use of a rod 514 and/or pressurized gas, the sleeve 550 may be furnished with a second aperture 570, as denoted in FIGS. 11a and 11b.

Put otherwise, the sleeve 550 may be removed from the blind hole 112 after inserting the insert 200 to the blind hole with the sleeve 550 by applying a pushing force to the insert 200 through the second aperture 570 of the sleeve to expel the insert 200 from the sleeve 550, for example by applying the pushing force to the insert 200 by using pressurized gas and/or applying the pushing force to the insert 200 by a rod 514.

As illustrated in FIGS. 16a to 16d, a tool 500 configured to be used in inserting an insert 200 into a tire 100 may comprise the jaws 502, 504 and/or the punch 512—also possibly including the sleeve 550—and/or the expelling rod 514 and/or the pressurized gas-based expelling functionality.

Figure 17:
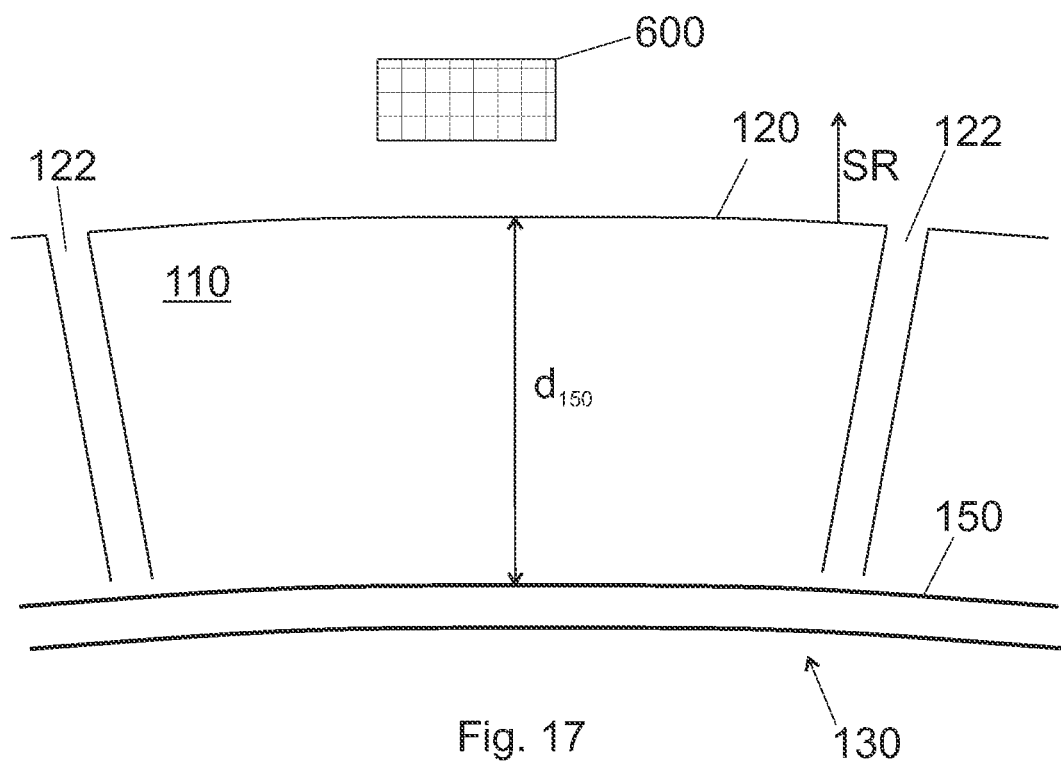
FIG. 17 illustrates determining a distance between a tread and a reinforcing belt, as viewed cross-sectionally from a side.

As noted above, and now referring to FIG. 17, a tire 100, for example a prefabricated tire 100, may comprise a reinforcing belt 150 between the tread 120 and the inner surface 130 of the tire 100. In such a case, and if the tire 100 does not already comprise a blind hole 112 for an insert 200, it is preferable that the blind hole 112 machined to a tread block 110 of the tire does not penetrate and thereby damage the reinforcing belt 150.

Consequently, preferably machining the blind hole 112 comprises determining a distance $d_{150}$ between the tread 120 and the reinforcing belt 150 and machining such a blind hole 112 to a tread block 110 that a depth $d_{112}$ of the blind hole 112 is less than the distance $d_{150}$ between the tread 120 and the reinforcing belt 150. That is, preferably the blind hole 112 is machined in such a way that it will not extend from the tread 120 to the reinforcing belt 150, but extends to a lesser depth into the tread block 110.

As an additional possibility, if the tire 100 comprises further elements on top of the reinforcing belt 150, which elements preferably are not to be damaged with machining a blind hole 112 into them, the thickness of such elements may be taken into account in machining the blind hole 112 in accordance with what is described immediately above. That is, in such a case, preferably machining the blind hole 112 comprises determining a distance $d_{150}$ between the tread 120 and the reinforcing belt 150 and machining such a blind hole 112 to a tread block 110 that a depth $d_{112}$ of the blind hole 112 is less than the distance $d_{150}$ between the tread 120 and the reinforcing belt 150 plus the thickness of other elements not to be penetrated into with the blind hole 112.

Determining a distance $d_{150}$ between the tread 120 and the reinforcing belt 150 may, for example, be premised on the reinforcing belt 150 comprising ferromagnetic or paramagnetic material such as ferromagnetic or paramagnetic metal, such as steel. In such a case, the determining of the distance $d_{150}$ between the tread 120 and the reinforcing belt 150 may be accomplished by using an inductive position sensor 600. Such an inductive position sensor 600 may be configured to sense the distance to a ferromagnetic or paramagnetic target.

The invention claimed is:

1. A method for inserting an insert into a tread of a tire, the tire comprising a vulcanized tire, the method comprising:

arranging the insert and the vulcanized tire comprising tread blocks forming the tread of the vulcanized tire, wherein the insert extends in a longitudinal direction from a bottom of the insert to the top of the insert and has a first cross section at a first longitudinal position from the bottom and a second cross section at a second longitudinal position from the bottom, wherein the first longitudinal position is located closer to the top than the second longitudinal position and an area of the second cross section is greater than an area of the first cross section, machining a blind hole into a tread block of the vulcanized tire, arranging at least a part of the insert into a sleeve that is configured to receive at least a part of the insert that has the first cross section and support at least a part of the insert that has the second cross section in the longitudinal direction and/or a transversal direction that is perpendicular to the longitudinal direction, and inserting the insert into the blind hole so that the bottom of the insert is inserted deeper in the blind hole than the top of the insert, wherein the insert is configured to measure an environmental parameter, or the insert is configured to indicate a condition of the vulcanized tire, wherein the insert comprises a flange residing on a plane on which a cross-section of the insert is at a maximum, the flange being located at the bottom of the insert, and a part of the sleeve is geometrically congruent with a part of the insert that is left in between the first longitudinal position and the second longitudinal position, and the sleeve is configured to support at least the flange when the insert is inserted into the blind hole so that the sleeve comprises a wall and the wall is configured to contact the flange when the insert is inserted into the blind hole, wherein the flange is prevented from deforming when the insert is being inserted into the blind hole;

wherein the blind hole has a first cross-section at a first depth and a second cross-section at a second depth, wherein an area of the second cross-section of the blind hole is larger than an area of the first cross-section of the blind hole and the second depth is greater than the first depth;

wherein the sleeve is an integral part of a punch that is used to insert the insert into the blind hole whereby the method comprises removing the sleeve from the blind hole after inserting the insert to the blind hole with the sleeve;

the sleeve limits a first aperture for receiving at least a part of the insert at a first end of the sleeve and a second aperture at an opposite second end of the sleeve, the first aperture defining a cavity extending to the second aperture;

the method comprising pushing the insert out of the sleeve by using a rod or pressurized gas through the second aperture.

2. The method of claim 1, the method comprising arranging at least a part of the insert into the sleeve so that a wall of the sleeve laterally surrounds at least a part of the insert wherein a thickness of the wall of the sleeve is at least 0.3 mm.

3. The method of claim 1, wherein the cavity tapers towards the second aperture.

4. The method of claim 1, wherein the insert comprises a primary capacitive component and a primary inductive component.

5. The method of claim 1, wherein the insert is configured to measure a condition of the vulcanized tire.

6. The method of claim 1, wherein the insert comprises a sensor for measuring the environmental parameter.

7. The method of claim 1, comprising applying adhesive at least in between the bottom of the insert and a bottom of the blind hole.

8. The method of claim 1, comprising applying a friction-reducing substance to the sleeve and/or to the blind hole.

9. The method of claim 1, wherein when the at least a part of the insert has been arranged into the sleeve, the sleeve extends in the longitudinal direction of the insert at least to the top of the insert.

10. The method of the claim 9, wherein when the at least a part of the insert has been arranged into the sleeve, the sleeve extends in the longitudinal direction of the insert beyond the top of the insert.

11. The method of claim 1, comprising arranging at least part of the insert to the sleeve by applying a pulling force to the insert through the second aperture of the sleeve.

12. The method of claim 11, comprising applying a pulling force to the insert by using suction.

13. The method of claim 1, wherein the material of the tread block has a Shore hardness of from 50 ShA to 80 ShA at a temperature of 23° C., the method comprising laterally stretching at least the part of the blind hole that has the first cross-section while inserting the insert to the blind hole.

14. The method of claim 13, comprising laterally stretching at least the part of the blind hole that has the first cross-section by using at least three jaws.

15. The method of claim 1, wherein the second cross section has a second cross sectional area, and the sleeve limits a first aperture for receiving the insert, the first aperture having a third cross section with a third cross sectional area.

16. The method of claim 15, wherein
  wherein the third cross sectional area is smaller than the second cross sectional area,
  the method comprising arranging a part of the insert into the sleeve so that the sleeve does not laterally surround a part of the insert that has the second cross section.

17. The method of claim 15, wherein the third cross sectional area is equal to or larger than the second cross sectional area.

18. The method of claim 17, comprising arranging the insert into the sleeve so that the sleeve laterally surrounds the insert.

* * * * *